United States Patent
Vardi

(10) Patent No.: US 9,460,612 B2
(45) Date of Patent: Oct. 4, 2016

(54) TAMPER-ALERT AND TAMPER-RESISTANT BAND

(71) Applicant: TechIP International Limited, Larnaca (CY)

(72) Inventor: Eyal Dov Vardi, Bet Nir (IL)

(73) Assignee: TECHIP INTERNATIONAL LIMITED, Larnaca (CY)

( * ) Notice: Subject to any disclaimer, the term of this patent is extended or adjusted under 35 U.S.C. 154(b) by 0 days.

(21) Appl. No.: 14/267,817

(22) Filed: May 1, 2014

(65) Prior Publication Data

US 2016/0078752 A1    Mar. 17, 2016

(51) Int. Cl.
| | |
|---|---|
| G08B 29/04 | (2006.01) |
| H04B 1/3827 | (2015.01) |
| G08B 25/10 | (2006.01) |

(52) U.S. Cl.
CPC ............ *G08B 29/046* (2013.01); *G08B 25/10* (2013.01); *H04B 1/385* (2013.01); *H04B 2001/3855* (2013.01); *H04B 2001/3861* (2013.01)

(58) Field of Classification Search
CPC .... G08B 29/046; G08B 25/10; H04B 1/385; H04B 2001/3855; H04B 2001/3861
See application file for complete search history.

(56) References Cited

U.S. PATENT DOCUMENTS

| | | | |
|---|---|---|---|
| 4,598,275 A | 7/1986 | Ross et al. | |
| 4,819,860 A | 4/1989 | Hargrove et al. | |
| 5,014,040 A | 5/1991 | Weaver et al. | |
| 5,075,670 A | 12/1991 | Bower et al. | |
| 5,204,670 A | 4/1993 | Stinton | |
| 5,216,909 A | 6/1993 | Armoogam | |
| 5,218,344 A | 6/1993 | Ricketts | |
| 5,298,884 A | 3/1994 | Gilmore et al. | |
| 5,589,840 A | 12/1996 | Fujisawa | |
| 5,742,256 A | 4/1998 | Wakabayashi | |
| 5,977,877 A | 11/1999 | McCulloch et al. | |
| 6,094,747 A | 8/2000 | Malick | |
| 6,104,295 A | 8/2000 | Gaisser et al. | |
| 6,112,563 A | 9/2000 | Ramos | |
| 6,218,945 B1 | 4/2001 | Taylor, Jr. | |

(Continued)

FOREIGN PATENT DOCUMENTS

| | | |
|---|---|---|
| DE | 3049091 | 7/1982 |
| DE | 3049091 A1 | 7/1982 |

(Continued)

OTHER PUBLICATIONS

Office Action issued in U.S. Appl. No. 13/331,648 dated Aug. 23, 2013.

(Continued)

*Primary Examiner* — Leon Flores
(74) *Attorney, Agent, or Firm* — Nixon & Vanderhye P.C.

(57) ABSTRACT

A tamper alert band includes a housing, a latch, and a latch-blocking member. The latch is configured to move between at least an unsecured position and a secured position, in the unsecured position first and second housing elements are movable with respect to each other and in the secured position the latch secured the first housing element with the second housing element. The latch-blocking member is controllably moveable between at least a first position and a second position, the blocking member being moveable to the first position when the latch is in the secured position to thereafter obstruct movement of the latch to the unsecured position.

15 Claims, 18 Drawing Sheets

(56) References Cited

U.S. PATENT DOCUMENTS

| | | |
|---|---|---|
| 6,225,906 B1 | 5/2001 | Shore |
| 6,236,319 B1 | 5/2001 | Pitzer et al. |
| 6,305,605 B1 | 10/2001 | Goetz et al. |
| 6,424,264 B1 | 7/2002 | Giraldin et al. |
| 6,472,989 B2 | 10/2002 | Roy, Jr. |
| 6,529,136 B2 | 3/2003 | Cao et al. |
| 6,727,817 B2 | 4/2004 | Maloney |
| 6,747,562 B2 | 6/2004 | Giraldin et al. |
| 6,753,782 B2 | 6/2004 | Power |
| 6,813,916 B2 | 11/2004 | Chang |
| 6,853,304 B2 | 2/2005 | Reisman et al. |
| 6,888,502 B2 | 5/2005 | Beigel et al. |
| 6,963,277 B2 | 11/2005 | Imasaki et al. |
| 6,998,984 B1 | 2/2006 | Zittrain et al. |
| 7,030,765 B2 | 4/2006 | Giraldin et al. |
| 7,084,764 B2 | 8/2006 | McHugh et al. |
| 7,098,792 B1 | 8/2006 | Ahlf et al. |
| 7,114,647 B2 | 10/2006 | Giraldin et al. |
| 7,123,141 B2 | 10/2006 | Contestabile |
| 7,132,944 B1 | 11/2006 | Kron et al. |
| 7,151,445 B2 | 12/2006 | Medve et al. |
| 7,158,030 B2 | 1/2007 | Chung |
| 7,239,238 B2 | 7/2007 | Tester et al. |
| 7,240,446 B2 | 7/2007 | Bekker |
| 7,242,306 B2 | 7/2007 | Wildman et al. |
| 7,256,681 B1 | 8/2007 | Moody et al. |
| 7,312,709 B2 | 12/2007 | Kingston |
| 7,324,000 B2 | 1/2008 | Zittrain et al. |
| 7,327,251 B2 | 2/2008 | Corbett, Jr. |
| 7,355,514 B2 | 4/2008 | Medve et al. |
| 7,374,081 B2 | 5/2008 | Mosher, Jr. |
| 7,382,268 B2 | 6/2008 | Hartman |
| 7,468,666 B2 | 12/2008 | Ciarcia, Jr. et al. |
| 7,479,891 B2 | 1/2009 | Boujon |
| 7,498,943 B2 | 3/2009 | Medve et al. |
| 7,554,446 B2 | 6/2009 | Ciarcia, Jr. et al. |
| RE41,171 E | 3/2010 | Howe, Jr. |
| 7,701,332 B2 | 4/2010 | Anderson |
| 7,714,725 B2 | 5/2010 | Medve et al. |
| 7,994,916 B2 | 8/2011 | Kron et al. |
| 8,001,235 B2 | 8/2011 | Russ et al. |
| 8,138,886 B1 | 3/2012 | Chang |
| 8,185,411 B2 | 5/2012 | Allard et al. |
| 8,328,299 B2 | 12/2012 | Hashemi et al. |
| 8,416,081 B2 | 4/2013 | Kron et al. |
| 8,736,447 B2 | 5/2014 | Ehrman et al. |
| 2002/0035484 A1 | 3/2002 | McCormick |
| 2002/0070865 A1 | 6/2002 | Lancos et al. |
| 2002/0075151 A1 | 6/2002 | Lancos et al. |
| 2003/0174059 A1 | 9/2003 | Reeves |
| 2003/0218539 A1 | 11/2003 | Hight |
| 2004/0080421 A1 | 4/2004 | Wunderlich |
| 2004/0174264 A1 | 9/2004 | Reisman et al. |
| 2005/0240441 A1 | 10/2005 | Suzuki et al. |
| 2006/0089538 A1 | 4/2006 | Cuddihy et al. |
| 2006/0131391 A1 | 6/2006 | Penuela |
| 2006/0187065 A1 | 8/2006 | Girvin et al. |
| 2007/0008138 A1 | 1/2007 | Mosher et al. |
| 2007/0017136 A1 | 1/2007 | Mosher et al. |
| 2007/0116036 A1 | 5/2007 | Moore |
| 2007/0194099 A1 | 8/2007 | Miller et al. |
| 2008/0028654 A1 | 2/2008 | Cardon et al. |
| 2008/0051667 A1 | 2/2008 | Goldreich |
| 2008/0057976 A1 | 3/2008 | Rae et al. |
| 2008/0126126 A1 | 5/2008 | Ballai |
| 2008/0126417 A1 | 5/2008 | Mazurik |
| 2008/0211677 A1* | 9/2008 | Shecter ............. G08B 21/0216 340/573.1 |
| 2009/0203971 A1 | 8/2009 | Sciarappa et al. |
| 2009/0224889 A1 | 9/2009 | Aggarwal et al. |
| 2009/0315716 A1 | 12/2009 | Lerch et al. |
| 2010/0089108 A1 | 4/2010 | Dutt et al. |
| 2010/0174229 A1 | 7/2010 | Hsu et al. |
| 2010/0238033 A1 | 9/2010 | Blumel et al. |
| 2011/0025852 A1 | 2/2011 | Tanaka |
| 2011/0050411 A1 | 3/2011 | Schuman et al. |
| 2011/0111736 A1 | 5/2011 | Dalton et al. |
| 2011/0127325 A1 | 6/2011 | Hussey et al. |
| 2011/0128145 A1 | 6/2011 | Todd et al. |
| 2011/0266343 A1 | 11/2011 | Liu |
| 2012/0050532 A1 | 3/2012 | Rhyins |
| 2012/0086573 A1 | 4/2012 | Bischoff et al. |
| 2013/0069514 A1 | 3/2013 | Hashemi et al. |
| 2013/0121658 A1 | 5/2013 | Kiet et al. |
| 2013/0182382 A1 | 7/2013 | Vardi et al. |

FOREIGN PATENT DOCUMENTS

| | | |
|---|---|---|
| GB | 2465849 A | 6/2010 |
| JP | 2004-46582 | 2/2004 |
| WO | 2008144952 | 12/2008 |
| WO | WO 2008-144952 | 12/2008 |

OTHER PUBLICATIONS

Office Action issued in U.S. Appl. No. 13/741,937 dated Apr. 24, 2014.

Office Action dated Apr. 24, 2014 in connection with U.S. Appl. No. 13/741,937, filed Jan. 15, 2013.

* cited by examiner

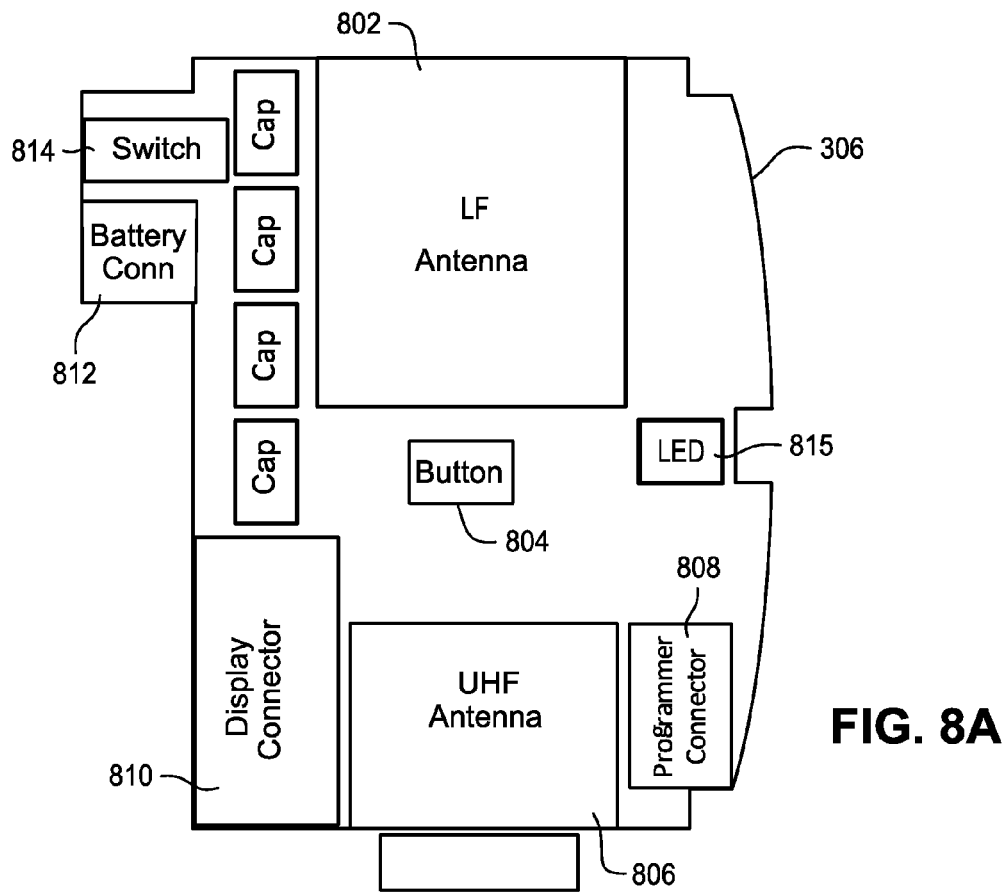
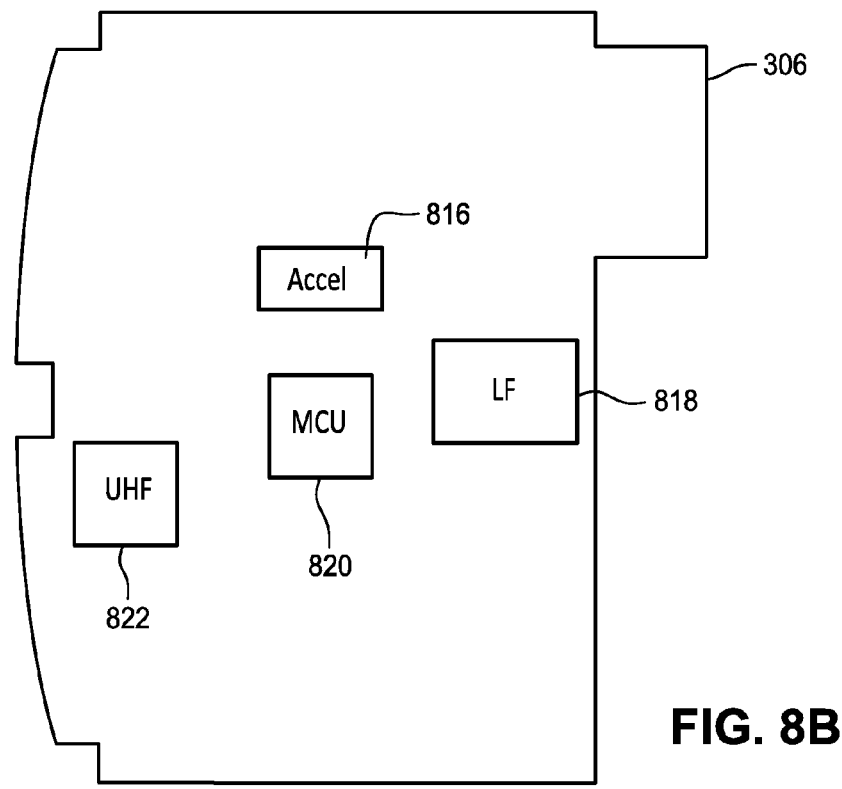
FIG. 8A
FIG. 8B

TAMPER-ALERT AND TAMPER-RESISTANT BAND

CROSS-REFERENCE TO RELATED APPLICATIONS

The contents of U.S. Publication No. 2013/0182382 are hereby incorporated by reference in its entirety.

FIELD

The technology herein generally relates to bands that include tamper-alert and tamper-resistant features, and related monitoring systems for those bands.

BACKGROUND AND SUMMARY

Wristbands are used for a variety of different purposes such as, e.g., to retain a wristwatch, to indicate admittance to a popular concert or nightclub, to provide identifying information for a hospital patient, and the like. In these examples, the wristband provides information to the person (e.g., the time) or provides information about the person (e.g., their name). Further ankle-bands and/or other bodily applied bands may function in a similar manner.

More recently some types of wristbands have included the capability to electronically store information. For instance, a hospital band may include information about the patient— e.g., the name, age, and associated medical conditions of the patient. In certain instances, such bands may also include radio frequency identification (RFID) devices that allow remote access to the information stored therein.

Wristbands can be secured to the wrist of a person through the use of a buckle (e.g., such as on a typical wristwatch), elastic members, or simply mechanically constricting the band enough so that it will not slide off the hand of the person (e.g., handcuff restraints). Other types of bands may enable more sophisticated security schemes.

One example of this is electronic monitoring where the band may be locked into place and not removable without a specific "key." A key could be a physical key or an electronic key that is used to control the locking and unlocking of the band. If the band is somehow removed (e.g., cut) then an alert may be triggered. Such a device is then both tamper resistant (e.g., due to the "key" requirement) and tamper alert (due to the alert that is triggered when cut).

However, these types of bands may be complex in operation and may be prone to false alarms, failure, or the like. Also, when a physical key is provided to allow unlocking of the band it can be lost, stolen, etc. Thus, it will be appreciated that new, improved, and/or otherwise interesting techniques in this area are continually sought after.

In certain example embodiments, a band does not require a key to lock or unlock the band (e.g., lock or unlock a patient bracelet used in a healthcare facility). For example, once a locking mechanism is based on a tool such as a key—residents can obtain the key or can try to break the lock (e.g., because the lock is externally accessible on the band). However, certain example embodiments hide the lock such that there is no visible lock to pry or access once the band is secured.

In certain example embodiments, a locking mechanism provides a strong lock on the release mechanism (e.g., a latch) of the band. The lock mechanically positions a "lock stopper" (e.g., a piece of metal, plastic, etc) in front of the release mechanism such that when the lock stopper is put into place it is very hard (e.g., infeasible) for a patient to trigger the release mechanism and remove the band.

In certain examples, the lock is coupled to a processor and transceiver in the band such that a remote computing system (e.g., operated by staff in a health care facility) can control the locked and unlocked state of the band.

In certain example embodiments, the lock stopper is a piece of material that a motor rotates into a locked position and out of the locked position. In certain examples, a processor and/or the motor can determine the positioning of the lock stopper based on whether a pressure sensor has been activated. For example, when the lock stopper is deployed in the locked position a corresponding structural element may contact a first pressure sensor. Activation of this pressure sensor may then indicate (to the internal processor) that the lock stopper has been moved to a locking position (e.g., to prevent the release mechanism from releasing). Conversely another pressure sensor is provided that activates when the lock stopper is moved to unlock position. The signals from one or both of the sensors may thus be used to electronically determine (e.g., by the processor of the band) whether the lock stopper is in an unlocked or locked state. This information can then be used by the processor to control a motor to move the lock to a specified location if desired.

In certain example embodiments, a band includes a housing, a latch (e.g., a release mechanism) and a lock stopper or blocking member. The housing has two elements that are movable with respect to each other when they are not secured. The latch is structured to secure the housing elements to one another such that they are effectively one unitary body. When the latch secures the two elements together the lock stopper may be moved into a locking position to prevent the latch from releasing. By moving the lock stopper into the locked position the latch is effectively locked in the secured position and the two housing elements cannot be (e.g., easily) separated.

In certain example embodiments, a strap is included with the band and is secured and/or affixed to the housing. In certain examples, one end of the strap is fixed to the housing while the other end is mated to the housing when the housing is secured. For example, the fixed end of the strap may be bolted or riveted to the housing and the "free" end of the strap may be placed into the housing and secured to the housing when the housing is closed and secured. In certain examples, the free end of the strap is coupled to the housing with cavities and corresponding matching protrusions that are provided in the housing, on the end of the strap, or both. Upon locking the secured housing, both ends of the strap cannot be easily removed (e.g., without destroying the strap or the housing)

In certain example embodiments, a circuit is created in a secured band by securing the housing and the strap. The processor in the housing may, responsive to securing the band, determine the resistance of the circuit and store that determined resistance to a memory device located within the housing. Thereafter, if the measured resistance of the band becomes less than or greater than a range or limit value(s) based on this initial determined resistance measurement, the band may trigger an alarm—e.g., sent to staff members of a health care facility In certain examples, a band may include an advanced level of identification and tracking. In certain examples, the band includes a micro-computer chip and RF (radio frequency) antenna which allows the information to be written and retrieved by RFID readers and/or exciters. The following example actions may trigger a tamper alert: 1) cutting the band (e.g., the strap); 2) opening the housing without authorization; 3) the battery on the band becoming low; 4) detection of the band being in an unauthorized location or outside an authorized location; 5) detection of the band failing to "ping" a central server (or respond to a "ping" initiated from the central server or the like) for more than, for example, 60 seconds, and the like; 6) shorting the circuit formed by the secured band and strap. In certain examples, each trigger (e.g., examples 1-6 above) may correspond to a different identified type of alert. For example, a critical message notification may be triggered when the band is cut or a service level notification may be triggered if battery power on the band is below a certain threshold.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 8A shows a first side of a electronic circuit board of the band of FIG. 1;

FIG. 8B shows a second side of the electronic circuit board of the band of FIG. 1;

DETAILED DESCRIPTION OF PREFERRED EMBODIMENTS

The following description is provided in relation to several example embodiments that may share common characteristics and/or features. It is to be understood that one or more features of any of the embodiments may be combinable with one or more features of other example embodiments. In addition, any single feature or combination of features in any of the embodiments may constitute an additional embodiment.

The example embodiments described herein may relate to bands worn on an extremity of a person. For example, the wrist of a patient at a hospital, the ankle of an inmate at a prison, a wrist of a child at an amusement park, etc. In certain example embodiments, a band may include a radio frequency identification (RFID) device that stores information and/or communicates with external sensors to track the positional location of the band (and thus the person wearing the band). Example bands may include a tamper alert structure configured to provide an alert when the band is removed or otherwise tampered with. Certain example bands may include a tamper-resistant structure that structurally prevents removal of the band from an extremity (e.g., ankle or wrist) of the user wearing the band.

Figure 1:
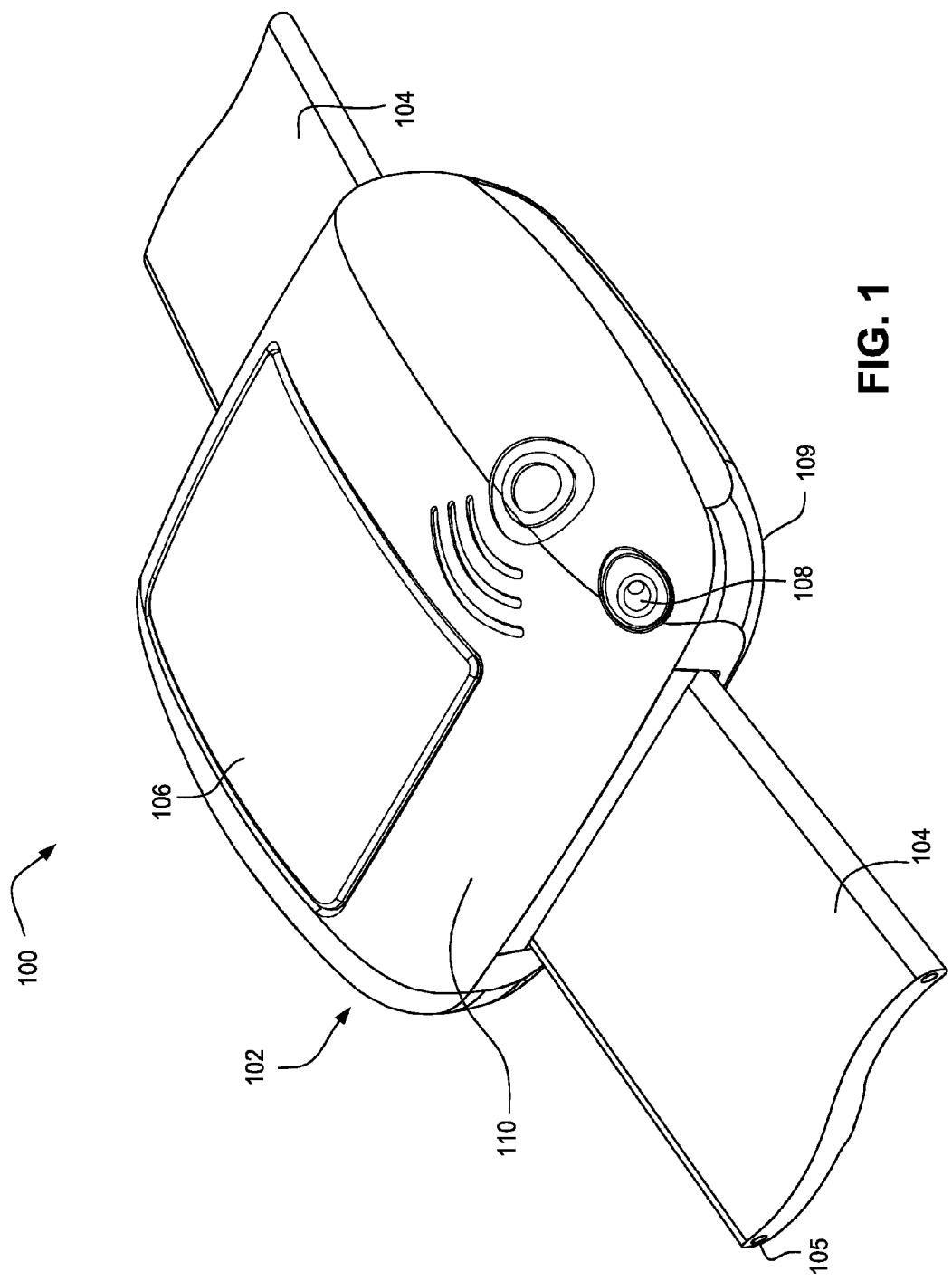
FIG. 1 is a perspective view of a band according to certain example embodiments.

FIGS. 1-7D show different views and/or different states band 100. FIG. 1 is a perspective view of band 100 that includes a strap 104 with ends that respectively interface or attach to housing 102. The strap 104 may be constructed out of any suitable material (e.g., leather, cloth, plastic, rubber, metal, PVC, etc) or any combination thereof—having suitable electrical resistivity and physical strength (e.g., with suitable built-in reinforcement). For example, the material of the strap 104 may include or consist of the material described in U.S. Publication No. 2013/0182382. The band 100 is thus designed to wrap about a wrist, ankle, etc of a wearer (e.g., a patient in a hospital, a child, or the like).

The housing 102 includes a top portion 110 that is movable or rotatable with respect to a bottom portion 109 of the housing 102. A part of the top portion 110 includes a display 106 that may be, for example, an LCD, LED, or other type of electronic display. In certain example embodiments, the display may be an electronic paper or e-ink display. It will be appreciated that any type of display may be used to visually convey information to a wearer of the band or to another user (e.g., a nurse, attendant, physician, etc). Types of information that may be displayed may include the time of day, certain patient information (dosage requirements, medical conditions, and the like), messages, directions, maps, and the like.

The housing 102 can be opened by pressing or otherwise actuating button 108 that is provided in a side of the housing 102. Depressing button 108 may cause a mechanical latch (e.g., a fastener) that is disposed within the housing 102 disengage from the bottom portion 109 of the housing 102 and allow the top portion 110 be separated from the bottom portion 109. In certain examples, the button 108 is provided flush with the surface of the housing 102. In certain examples, the button may protrude from the outer surface of the housing 102.

Figure 2:
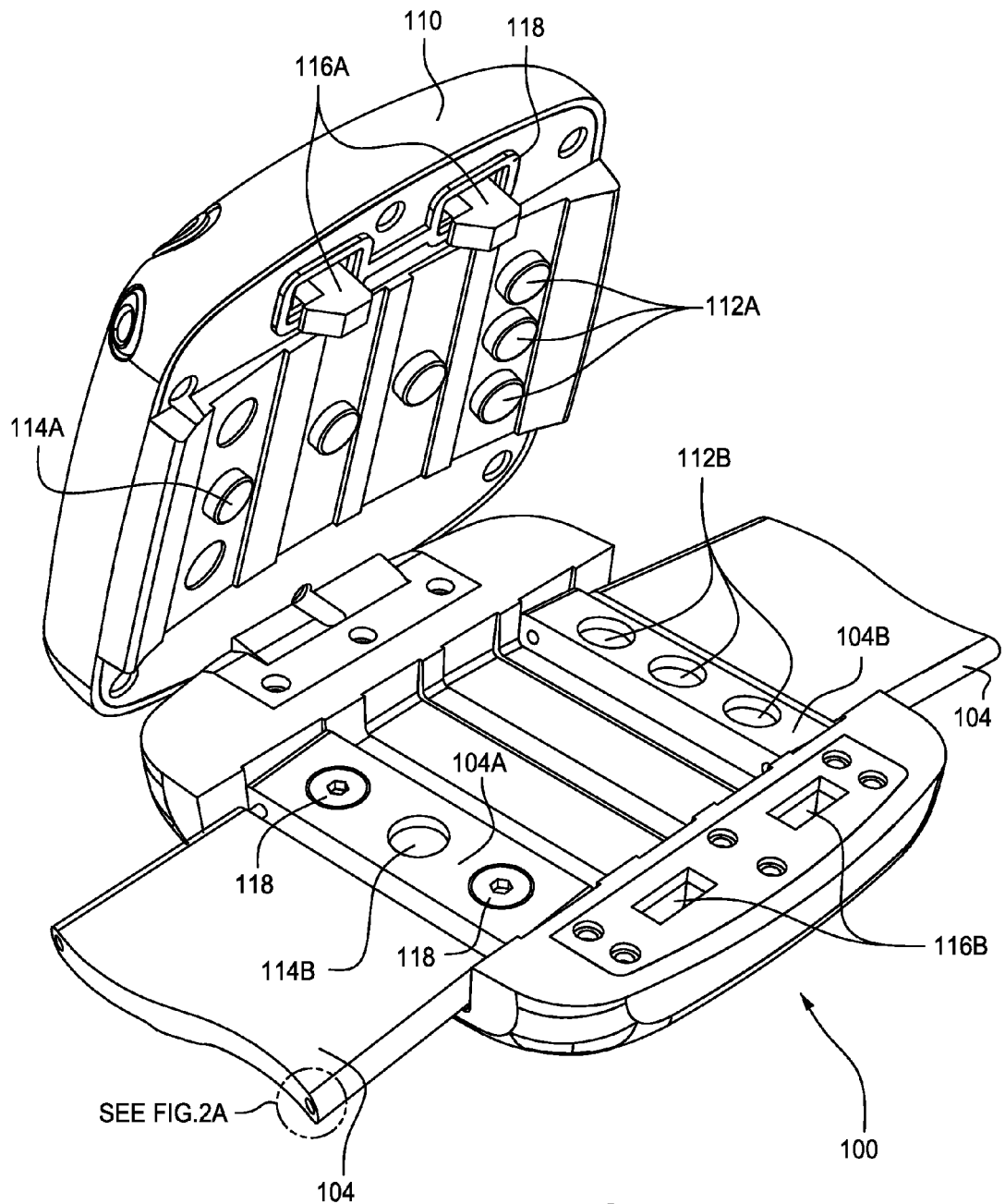
FIG. 2 is a perspective view of the band in FIG. 1 in an open position.
Figure 2A:
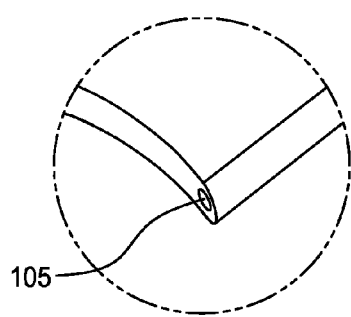
FIG. 2A shows an expanded view of one portion of FIG. 2.

FIG. 2 is a perspective view of the band in FIG. 1 in an open position. Top portion 110 of the housing 102 has been rotated away from the bottom portion 109 of the housing 102 to expose the interior of the housing 102. The strap 104 includes ends 104A and 104B that are secured to housing 102 when the housing is in a closed position.

Strap ends 104A and 104B are cast of a metal alloy and, when the housing is closed, are conductively coupled through the housing to each other. Specifically, ends 104A and 104B include receiving cavities 114B and 112B that, respectively, accept protrusions 114A and 112A. The contact of protrusions 114A and 112A with ends 104A and 104B form a conductive link, through the housing, and the strap between ends 104A and 104B. In certain examples, the protrusions and/or the corresponding ends of the strap are made out of a metal alloy and/or conductive rubber.

The strap 104 includes a pair of strong and electrically conductive elements 105 (e.g., stainless steel wires or cables of sufficient diameter to be difficult to cut through with scissors) that run the length of the strap 104 to conductively connect ends 104A and 104B. Accordingly, a circuit may be formed that includes conductive elements 105 (e.g., one or more of these), ends 104A and 104B, protrusions 114A and 112A, and the interior circuits within housing 102. In certain examples, when the housing is closed and a strap is attached to the housing the presence of the strap may be detected due the creation of the circuit. The detection of closure and securing of a strap may cause electronics disposed in the housing (or elsewhere) to trigger additional processes (e.g., the initialization of process described in connection with FIG. 12).

In certain example embodiments, the ends 104A and 104B can be casted with and/or around the material that forms the flexible part of the strap 104. In certain example embodiments, the conductive elements are wires that are embedded in a rubber over mold of the strap. In certain examples the conductive wires may include a conductive mesh (as described below).

End 104A of the strap 104 may be more permanently secured to the housing by using bolts 118 to secure end 104A of the strap 104 to the housing 102 on substantially permanent basis (e.g., end 104 becomes a "fixed" end of the strap). It will be appreciated that other techniques for affixing one end of the strap (e.g., the fixed end) to the housing may be used—e.g., bolts, rivets, glue, directly molding the strap into the housing, or the like.

The end 104B may remain "free" until placed into the housing and secured into place by closing the housing around the end 104B (e.g., as shown in FIG. 1). A supply of different length straps can be kept available to insure a proper fit for each individual wearer.

The top portion 110 is secured to the bottom portion 109 when prongs 116A of latch 308 (shown in FIG. 3A) engage with receiving apertures 116B of latch plate 316 (shown in FIG. 3A) affixed to the bottom portion 109. A gasket 118 is included for sealing interior portions of the housing 102 from water (e.g., interior areas that contain electronics and the like). The latch 308 and the respective prongs 116A are configured to move laterally in response to actuation of button 108 (typically against a suitable spring force). In other words, when the top portion is secured to the bottom portion by the latch, a person may depress the button 108 into the housing to move the latch to an opening position. The housing may then be opened. In certain examples, the top portion is spring loaded so that moving the latch to the open position (e.g., FIG. 7A) will automatically cause the top portion to swing away from the bottom portion. In certain examples, no spring may be included and a user may manually move the top portion so as to open the housing. In certain examples the top and bottom portions are rotatably attached to each other.

In certain examples, the top portion and bottom portion are secured only by latches. For example, a corresponding latch (e.g., similar to latch 308) on an opposing side of the top portion may be included instead of the hinge shown in FIG. 2.

In certain example embodiments, an organization (e.g., a hospital) may have multiple housings that are stored separately from straps. The straps that are stored may be of different lengths (e.g., small, medium, large). When the organization desires to deploy a band to a patient, staff may select one of the housings and a strap of an appropriate length for a give patient. For example, a child may be provided with a shorter length strap than an adult (e.g., a person with thicker wrists).

One end of the strap may then be affixed to the housing by a staff member by using a specialized tool for securing and un-securing bolts to the housing (e.g., bolts 118). The staff member may then place the band on the wrist or ankle of a patient, wrap the strap around and place the other end (e.g., the free end) of the strap into the area shown in FIG. 2.

With the other yet-to-be secured end of the strap in place the housing may be closed and secured thus securing the strap end that does not include bolts to the band. It will be appreciated that due to the nature of how the studs or protrusions disposed in the upper housing interact with the apertures of the strap end that it may be very difficult to remove the strap from the housing without first un-securing the top portion of the housing from the bottom portion (e.g., the strap would need to be cut or the housing destroyed).

Figure 3A:
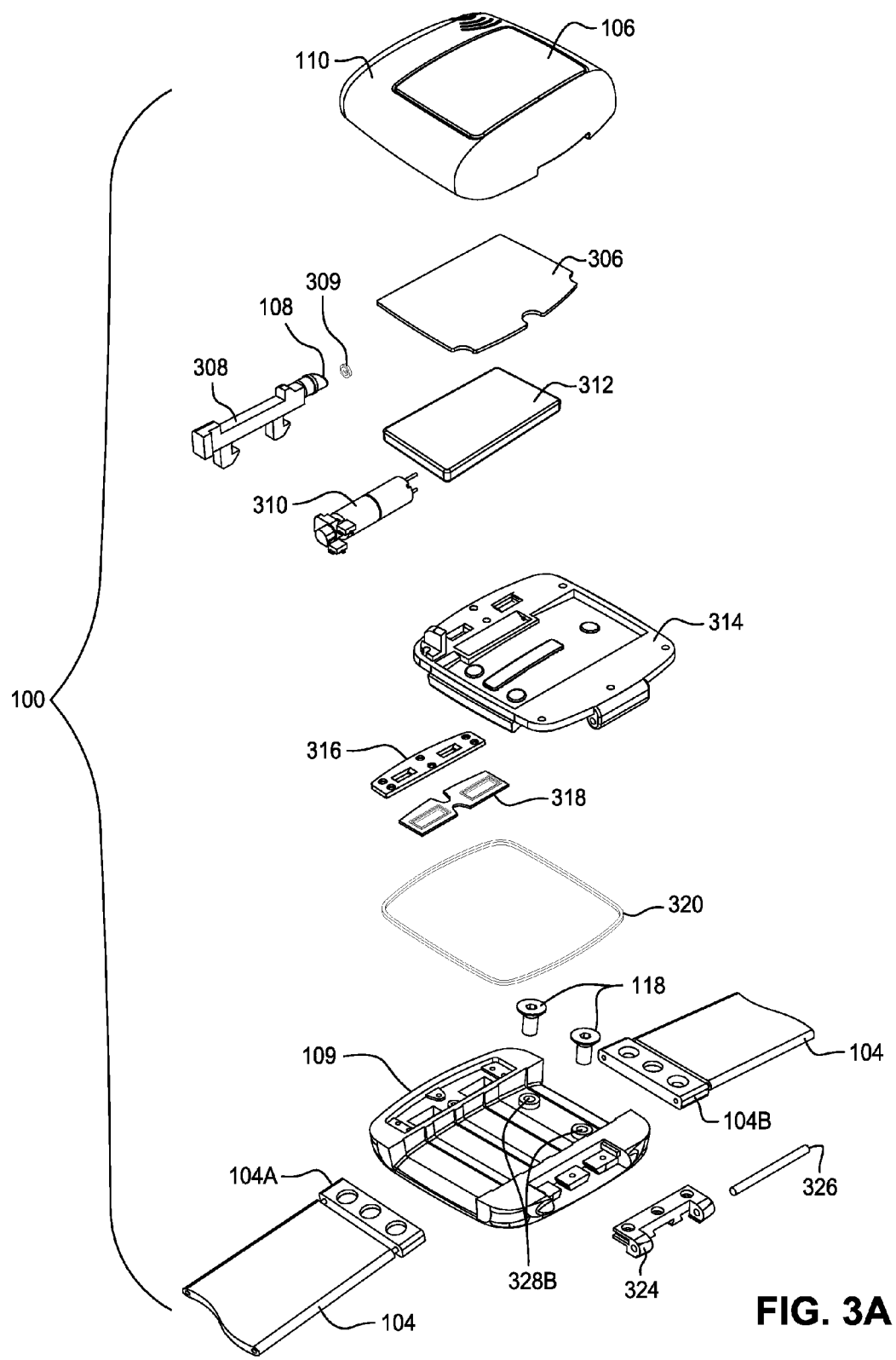
FIGS. 3A and 3B are exploded views of the band shown in FIG. 1.
Figure 3B:
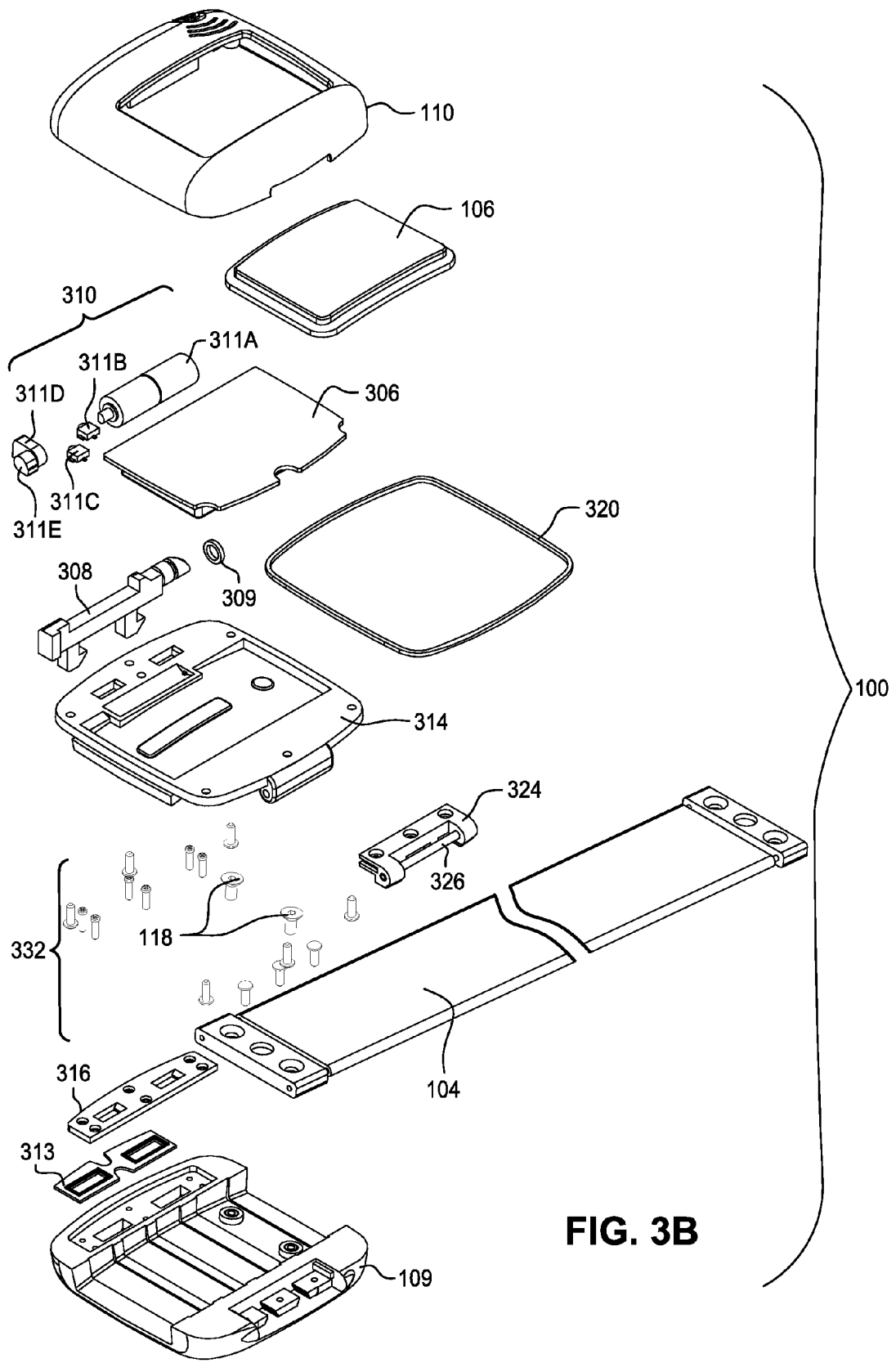

FIGS. 3A and 3B are exploded views of the band, housing, and strap shown in FIG. 1. The exploded views are similar in nature and show certain components that are included with band 100.

Top portion 110 includes an aperture in which a display 106 is disposed. The display 106 may include a layer of glass (or other transparent material) that covers an electronic display (e.g., an LCD, electronic ink display, etc). The glass layer may be used to provide the display with water tight features.

Under the display 106 is a printed circuit board (PCB) 306. The PCB is discussed in more detail in relation to FIGS. 8A and 8B and may include a central processing unit (CPU), a memory device (e.g., flash memory or the like), a transceiver (e.g., for wireless connectivity), or other components. Backing the PCB 306 is a battery 312 that provides power for the PCB and/or other components in the band (e.g., the display, the motor, etc).

Mid plate 314 provides a supporting structure upon which the battery, PCB, and the like are mounted. Top portion 110 is configured to mate with the mid plate to provide an enclosed area in the housing 102 where the electrical components are protected from outside environments (e.g., water, humidity, etc). Mid plate o-ring 320 is disposed with the mid plate 314 and used to facilitate the sealing of the enclosure created between the top portion 110 and the mid plate 314—e.g., to make the enclosed space water tight.

Also included in the enclosure created by combining the mid plate and top portion is locking system 310 and latch 308. The locking system 310 includes motor 311A, unlock tactile switch 311B, lock tactile switch 311C, lock portion 311D of a lock wedge (also referred to as a lock stopper), and unlock portion 311E of the lock wedge.

The motor 311A can be an electro-mechanical motor that (as described in greater detail below) rotates the lock wedge to lock the latch in place (e.g., to prevent the latch from moving to an open or unsecured position) or to allow the latch to be moved to the open position to thereby open the housing 102.

The motor 311A may be a 6 mm gear reduced motor that is configured to low power operation and moving the wedge between the at least two different positions. It will be appreciated that other types of machines may be used in place of an electro-mechanical motor. For example, a solenoid (e.g., a rotary solenoid) may be used to power movement of the lock wedge.

Tactile switches 311B and 311C are provided as lock state indicators for where (or how) the lock wedge is currently located. Specifically, based the tactile engagement of either the lock 311D or unlock portion 311E of the lock wedge with the respective tactile switches 311B and 311C, the lock system (or a processor in, or exterior to, the housing) may determine the "state" of the locking system (e.g., is the lock stopper engaged or not engaged to prevent or permit latch opening). In certain examples, the type of tactile switch used may be the B3U series of ultra-small tactile switches from Omron Corporation.

In more detail, when the unlock portion 311E of the lock wedge is engaged with the tactile switch 311C, the locking system may determine that the lock wedge is deployed such that the locking portion of the wedge is preventing the latch from releasing and the opening of the housing 102. Conversely, if the lock portion of the lock wedge is engaged with the tactile switch 311B, the locking system may determine that that lock wedge is deployed such that latch is free to be unlocked. In other words, the lock portion and the unlock portion of the lock wedge may be one unitary body such that when one portion rotates the other portion correspondingly rotates. For example, if the lock portion rotates 90 degrees in clockwise direction, the unlock portion correspondingly rotates 90 degrees in the clockwise direction.

In certain examples, one tactile switch may be used and the activation and non-activation of the switch may be used to determine the locked state of the locking system. For example, if an appropriately located tactile switch is activated (e.g., some part of the lock wedge is contacting the switch), the lock system may be determined to be in an unlocked state. Conversely, if no signal is being generated by that tactile switch, the lock system may be determined to be in a locked state.

Returning to latch 308, the main body of the latch is securely disposed between the mid plate 314 and the top portion 110 so that it may move longitudinally along the main long (e.g., major) axis of the latch. A latch o-ring 309 is provided to prevent water from entering from the outside of the housing through the area where the depressible button 108 is located.

The prongs 116A of latch 308 are designed to extend down through apertures of the mid plate 314 and into receiving apertures in the bottom portion 109. For example, the bottom portion 109 includes a latch plate 316 and a latch plate gasket 318 that is disposed between and affixed to a main body of the bottom portion 109 and the latch plate 316. In certain examples, the bottom portion is a structurally continuous structure that is molded in a single or multi-step molding process. Two hollowed out portions of the bottom portion 109 may be included to receive the prongs of the latch 308. Accordingly, the prongs of the latch 308 extend through apertures in the latch plate and the corresponding latch plate gasket (provided for water proofing the interior of the housing 102) to allow the top portion 110 (and the mid plate 314) to be secured to the bottom portion 109.

Also affixed to lower portion 109 of housing 102 are hinge 324 and a corresponding hinge pin 326 that couple the bottom portion 109 to the top portion 110 (and the mid plate 314). The top portion 110 may then rotate with respect to the bottom portion when the top portion is not secured to the bottom portion. The housing 102 thus may be viewed as a clam shell like device that opens along one side of the housing 102 so as to expose the receiving areas for strap ends that are to be secured to the housing. Multiple bolts 332 are used to secure components of the housing to one another.

Figure 4A:
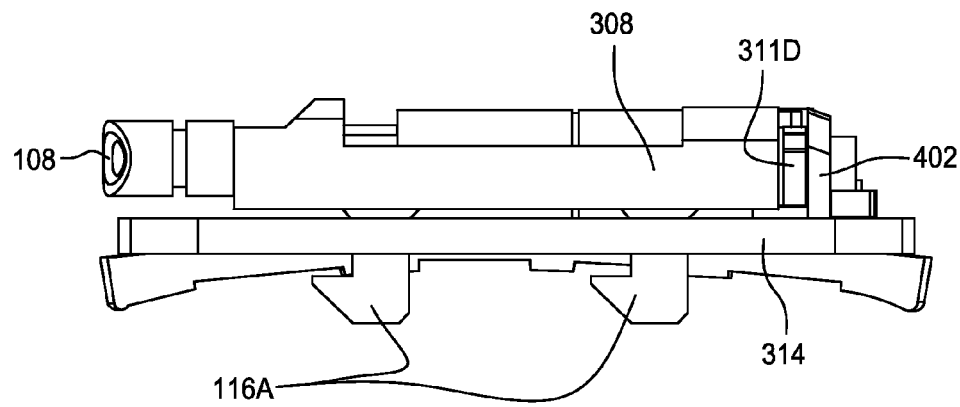
FIG. 4A is a cut-away side view of the housing with the latch in a secured position.
Figure 4B:
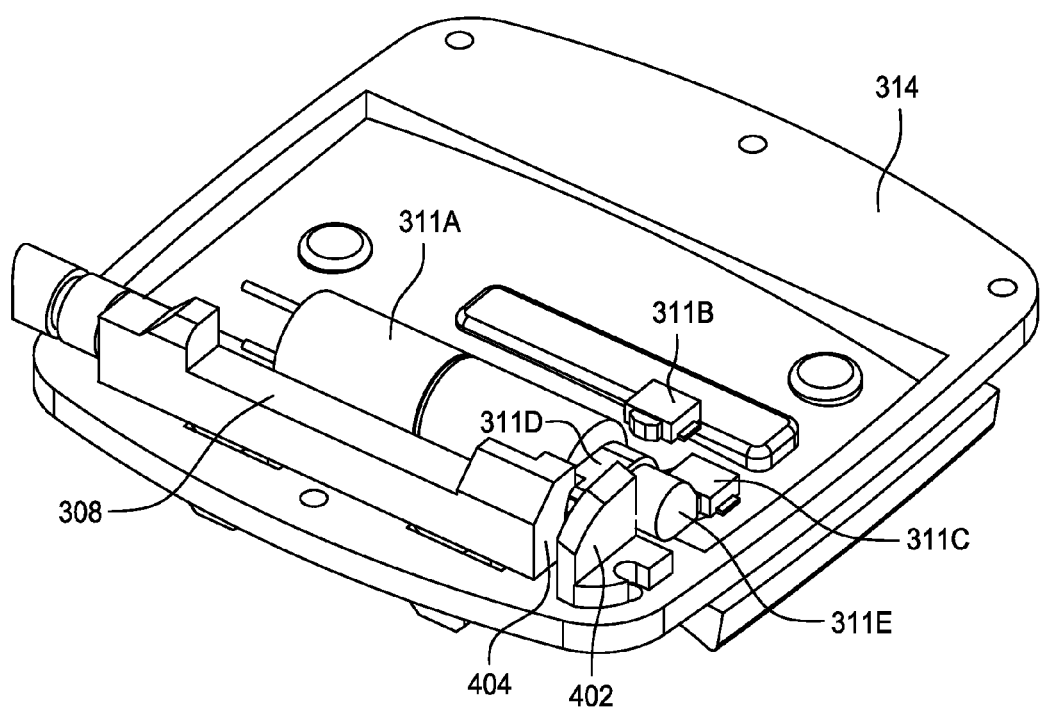
FIG. 4B is a cut-away perspective view that corresponds to the cut-away side view of FIG. 4A.
Figure 4C:
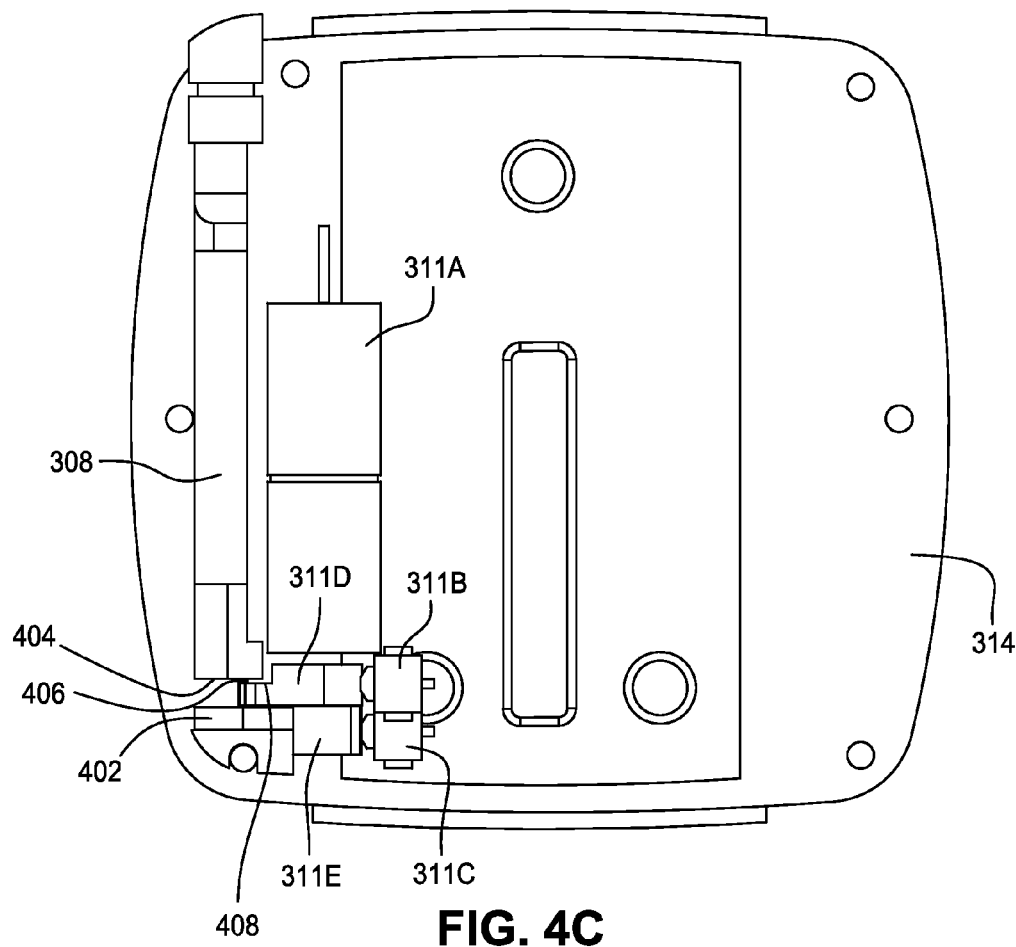
FIG. 4C is a cut-away top view that corresponds to the cut-away side view of FIG. 4A.
Figure 4D:
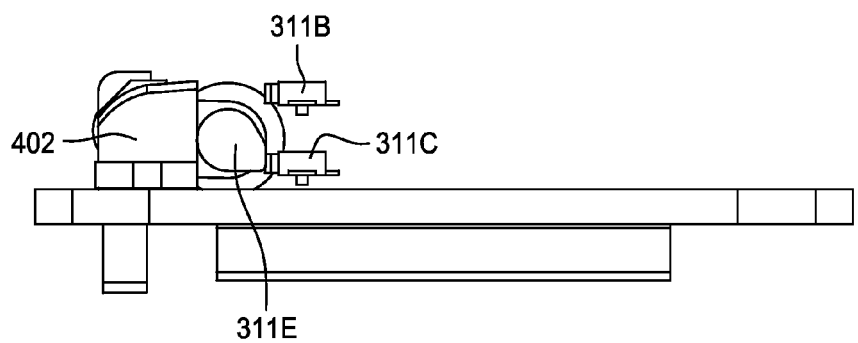
FIG. 4D is a cut-away side view that is perpendicular to that of FIG. 4A.

FIG. 4A is a cut-away side view of the housing with the latch in a secured position. FIG. 4B is a cut-away perspective view that corresponds to the cut-away side view of FIG. 4A. FIG. 4C is a cut-away top view that corresponds to the cut-away side view of FIG. 4A. FIG. 4D is a cut-away side view that is perpendicular to that of FIG. 4A.

Block 402 is disposed on and affixed to the mid plate 314. Block 402 is designed to stop lateral movement of the latch. In certain examples, the block is bolted or otherwise attached to the mid plate 314. In certain examples, the block is an integral part of the mid plate—e.g., part of a mold that is used to create the mid plate by casting or the like. In other examples, the block is a separate piece of metal attached to the mid plate.

In FIGS. 4A-4D, the lock wedge of the lock system 310 is rotated so that the lock portion 311D of the lock wedge is interposed between an end of the latch and the block 402 along the movement travel path to release latch prongs 116A. Placing the lock wedge into this position locks the latch 308 into a secured position and prevents the prongs 116A from disengaging with bottom portion 109 of housing 102. In other words, when the band 100 adopts this state, a strap that has been secured to the housing should be very difficult (e.g., infeasible) to remove (e.g., without cutting the strap or destroying the housing).

In certain examples, the latch 308 is slightly biased in a direction opposite block 402—e.g., through the use of a spring or the like. The biasing action forces the latch to adopt the secured position as a default position. Accordingly, when the housing is closed, the latch will automatically secure the top portion 110 to the bottom portion 109. The locking system 110 can then engage and deploy the locking wedge to "lock" the latch into the secured position.

When the latch 308 adopts the secured position there may be a small gap 406 between end surface 404 of latch 308 an opposing surface 408 of lock portion 311D.

When the locking system 310 is in a locked state, the unlock portion 311E of the lock wedge contacts the sensor 311C. This contact may indicate to the PCB 306 (or components thereon) that the lock wedge is engaged and that the locking system 110 is in a locked state. That information can be used to prevent the motor 311A from unnecessarily trying to again rotate the lock wedge into the locked position. Correspondingly, tactile sensor 311B is, in this state, not activated because the lock portion of the lock wedge is not contacting the corresponding tactile sensor. This inferential information may also be used to determine the current state of the lock system 310 and to prevent unnecessary use of motor 311A (and unnecessary drain of the battery)

Figure 5A:
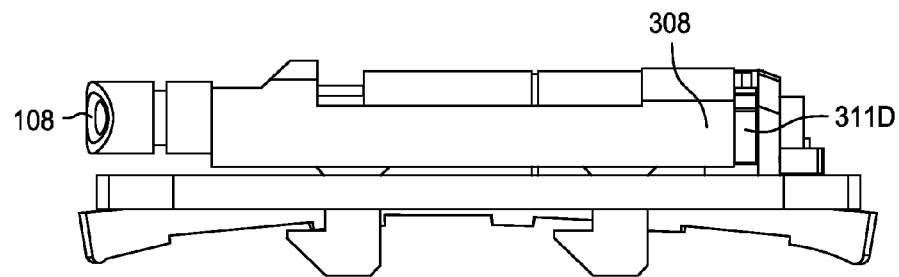
FIG. 5A is a cut-away side view of the housing with the secured latch engaged with a lock.
Figure 5B:
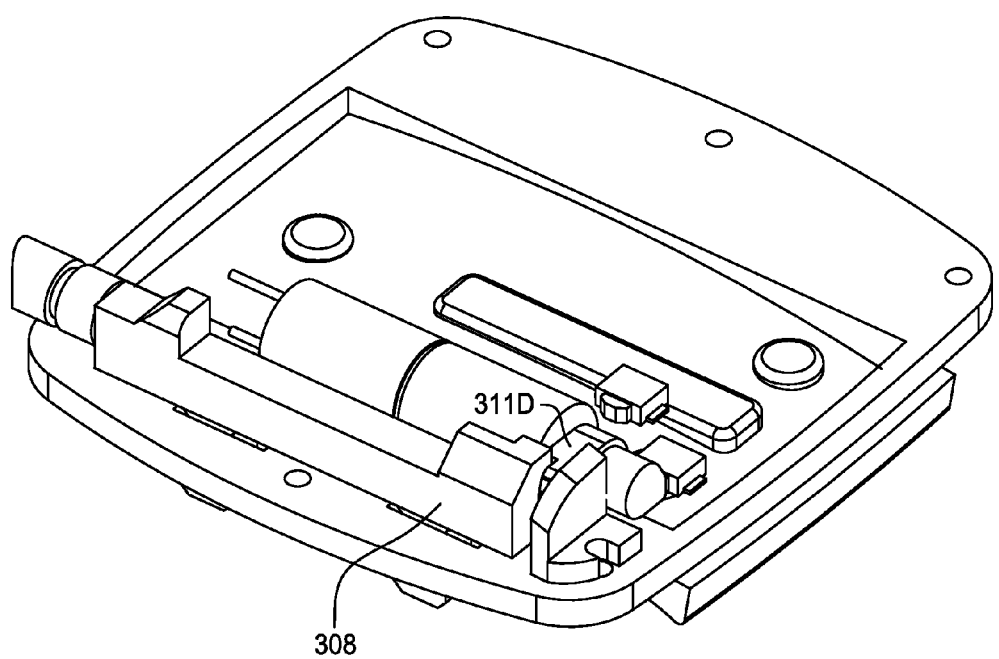
FIG. 5B is a cut-away perspective view that corresponds to the view of FIG. 5A.

FIG. 5A is a cut-away side view of the housing with the secured latch engaged with a lock and FIG. 5B is a cut-away perspective view that corresponds to the view of FIG. 5A. In these figures, while the latch is still locked in the secured position, the latch has laterally moved so that the small gap 406 that is shown in FIG. 4B is no longer present between end surface 404 of latch 308 and a corresponding surface 408 of the lock portion 311D. This may occur because the person using the band has triggered or pressed button 109 to thereby cause the latch to move to the fully abutting position shown in FIGS. 5A and 5B.

In certain examples, a pressure switch or pressure indicator is disposed on the corresponding surface 408 of the lock portion 311D (or surface 404) and is configured to indicate (e.g., to components on the PCB 306) that the latch is now being pressed into contact with the lock wedge (or that the latch has been moved a bit from the secured position).

In certain examples, conductive connections may be provided between PCB 306 and latch 308. For example, one connection may extend from a location on the latch near the button 108 to the PCB while another conductive connection may be provided from the lock wedge to the PCB. Accordingly, when the latch contacts the lock wedge as shown in FIG. 5A a closed circuit may be formed and detected by, for example, a sensor or processor of the PCB. This information may be used to trigger additional functionality described herein and/or U.S. Publication No. 2013/0182382, the contents of which are incorporated by reference.

One example of additional functionality is the transmission of a request for assistance in response depressing the button 108 when the latch is locked and in the secured position. For example, a patient in a hospital may be provided with a band according to certain examples described herein and may trigger a nursing assistance request by merely pressing button 108. In certain examples, such a request may be treated as an emergency request by receivers of the request (e.g., indicating immediate assistance is needed). Thus, the button 108 can serve at least functions (release of the latch and trigging a message)

It will be appreciated that other types of additional, or alternative, functionality may be triggered—e.g., by depressing button 108 a certain number of times (for example 2 or more times) within a time window (e.g., 5 seconds), by a prolonged constant depression beyond a predetermined time, etc. Non-limiting examples include: 1) a request to unlock the band; 2) a request for information; 3) an access request (e.g., the patient is outside a door and would like access to a particular room). Certain requests may be contextual requests based on other types of information sensed by the band 100. For example, the time of day or the location (e.g., GPS or other wise determinable) of the band may be used to determine what type of request is to be issued in response to depression of button 108. In certain examples, the determination of what action is to be taken in response to triggering of button 108 is accomplished by a remote server. In other words, the band 100 may transmit a signal whenever the button 108 has been depressed and the server (e.g., a remote computing device) or remote processing system may then determine what action to take in response to the triggered button 108.

Figure 6A:
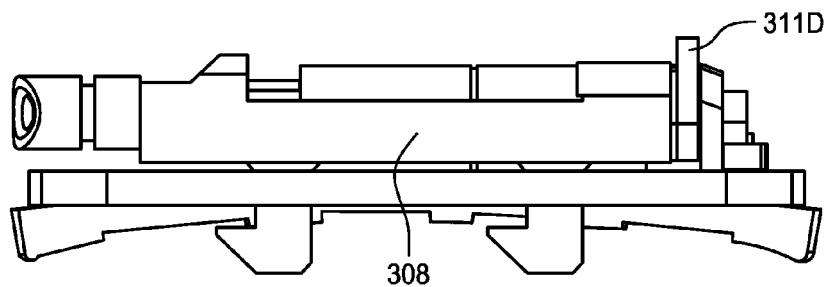
FIG. 6A is a cut-away side view of the housing with the latch in a secured position and the lock disengaged.
Figure 6B:
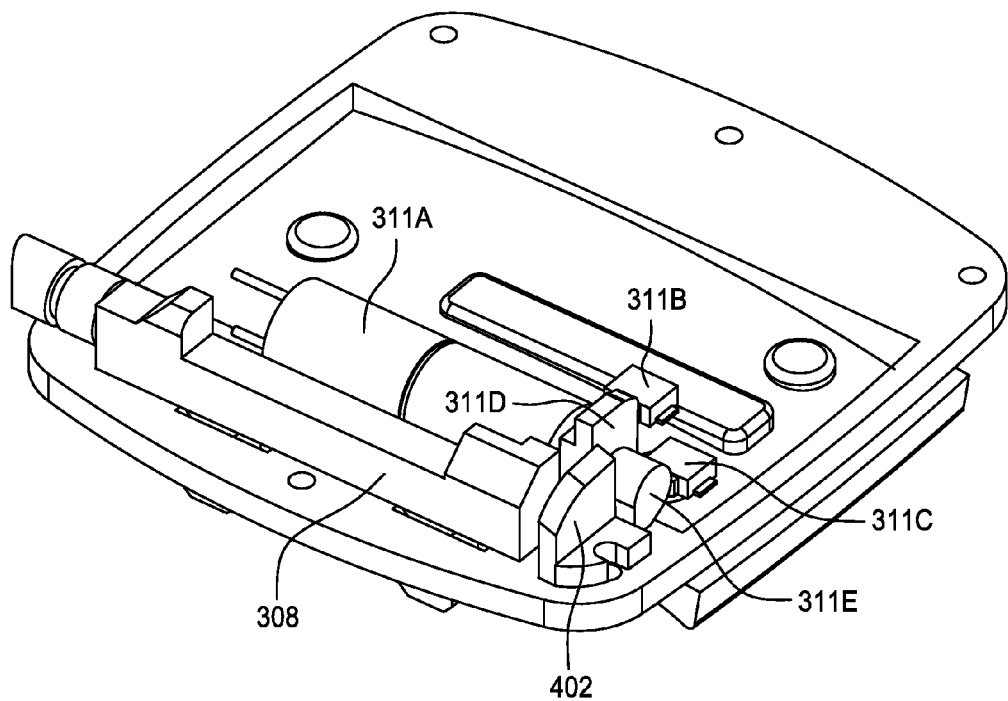
FIG. 6B is a cut-away perspective view that corresponds to the view of FIG. 6A.

FIG. 6A is a cut-away side view of the housing with the latch in a secured position and the lock disengaged and FIG. 6B is a cut-away perspective view that corresponds to the view of FIG. 6A. Here, the lock wedge is rotated so that lock portion 311D is rotated away from the gap between the latch 308 and the block 402. The lock wedge is rotated by motor 311A and causes the lock portion 311D to engage tactile sensor 311B. When the lock portion 311D engages the tactile sensor 311B, the motor may be shut off. Additionally, when the lock wedge is thus moved the unlock portion 311E is disengaged from tactile sensor 311C.

The removal of the lock portion 311D from the gap between the latch 308 and the block 402 allows the latch 308 to move longitudinally up to block 402 in response to depressing button 108. In other words, a person wearing band 100 may, when the lock portion 311D is not interposed between clock 402 and latch 308, move the latch 308 to the position (an unsecured position) shown in FIGS. 7A-7D.

Figure 7A:
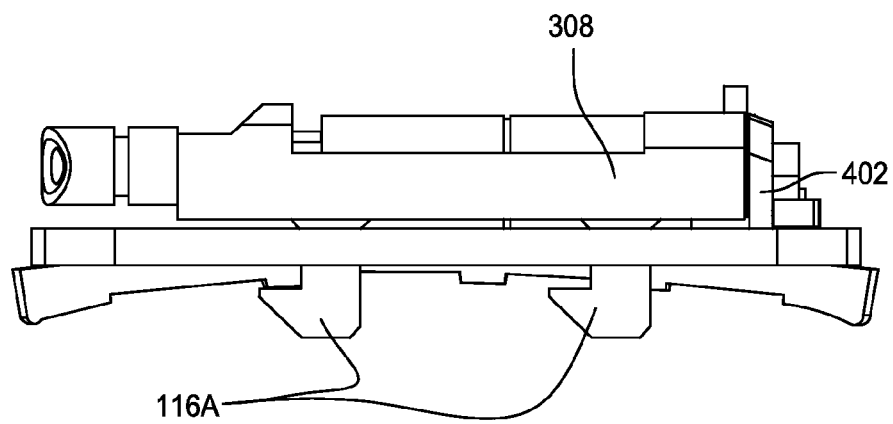
FIG. 7A is a cut-away side view of the housing with the latch moved to an unsecured position while the lock is disengaged.
Figure 7B:
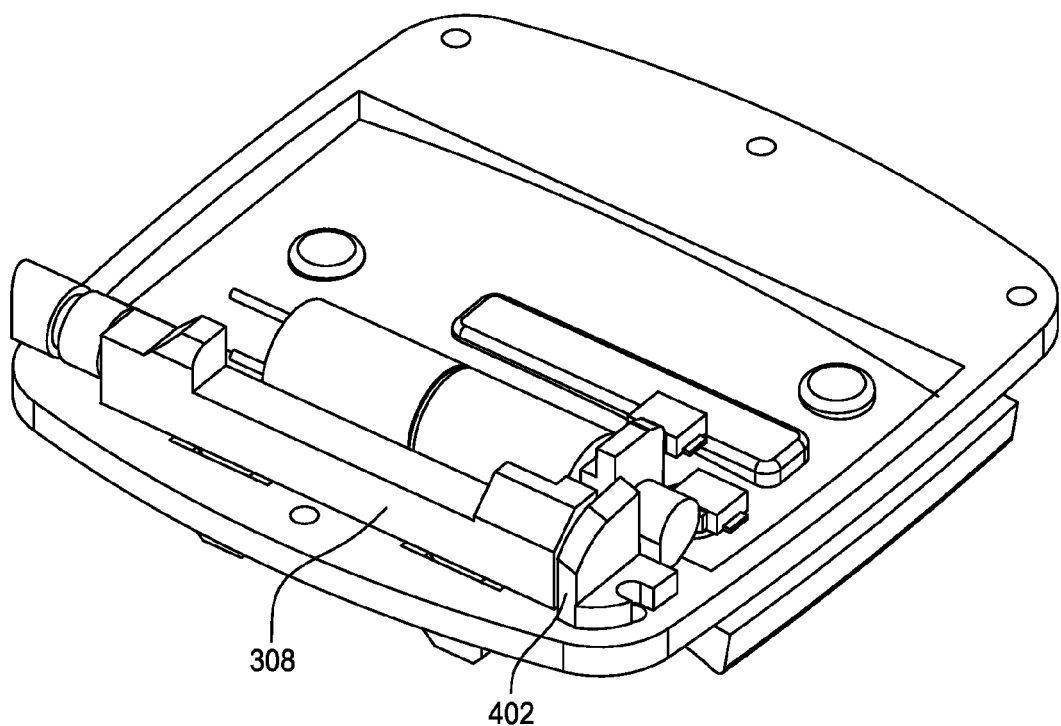
FIG. 7B is a cut-away perspective view that corresponds to the view of FIG. 7A.
Figure 7C:
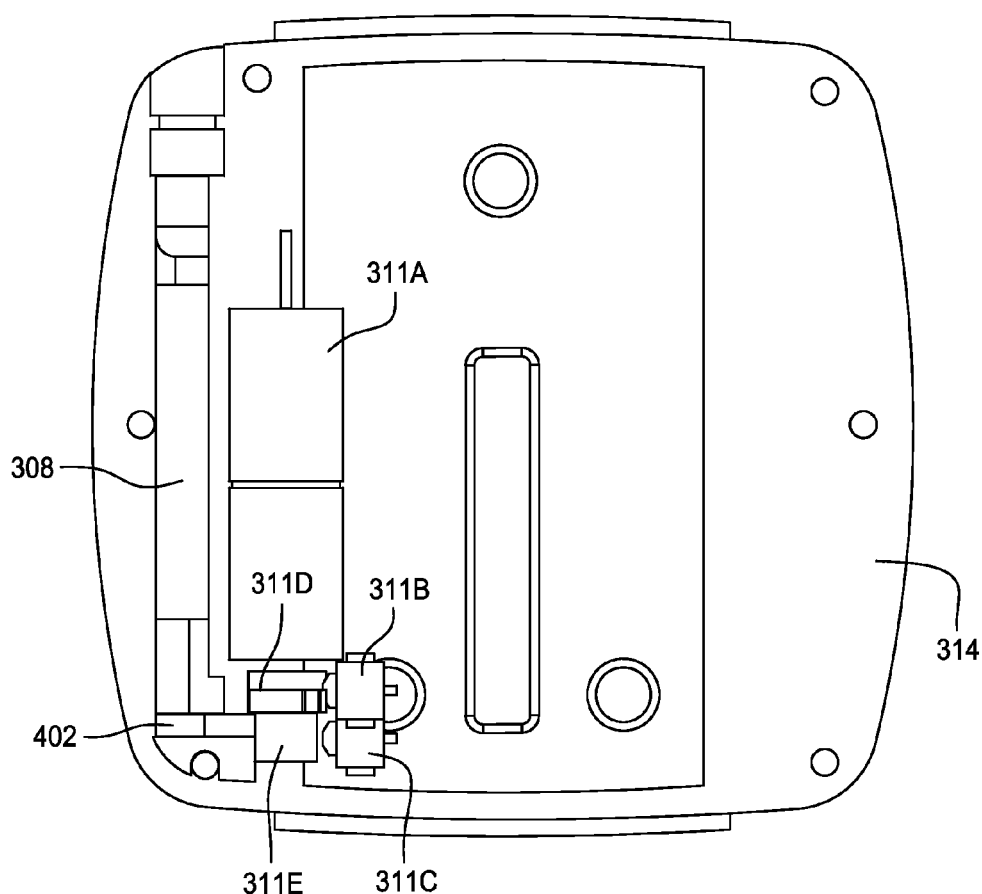
FIG. 7C is a cut-away top view that corresponds to the view of FIG. 7A.
Figure 7D:
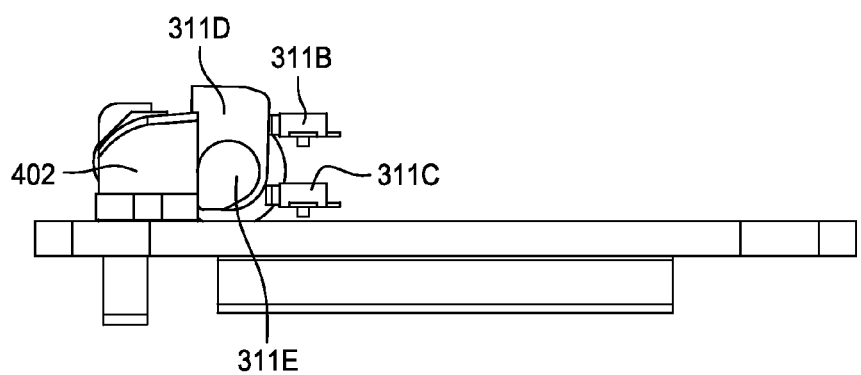
FIG. 7D is a cut-away side view that is perpendicular to that of FIG. 7A.

FIG. 7A is a cut-away side view of the housing with the latch moved to an unsecured position while the lock is disengaged, FIG. 7B is a cut-away perspective view that corresponds to the view of FIG. 7A, FIG. 7C is a cut-away top view that corresponds to the view of FIG. 7A, and FIG. 7D is a cut-away side view that is perpendicular to that of FIG. 7A.

In these figures, latch 308 is moved to an unsecured position against the block 402 such that the clam shell housing 102 may then be opened because the hooks on the prongs 116A of the latch 308 may pass through the apertures in latch plate 316.

In certain examples, pressure sensors may be placed on a surface of the block 402 facing the end surface 404 of the latch. When the sensors come into contact with each other, the lock system 310 may determine that the latch 308 has been moved to the unsecured position (e.g., due to a person pressing the button 108 to move the latch 308).

In certain example embodiments, unlock portion 311E is independently rotatable with respect to the lock portion 311D of the lock wedge. In other words, the motor 311A maybe switched (e.g., mechanically or electrically) between rotating the respective portions of the lock wedge. In other examples, the lock and unlock portions of the lock wedge are integral parts of one structural body such that rotating one portion necessarily rotates the other portion. Accordingly, when the lock portion 311D is rotated from the locked position in FIG. 4A to the unlocked position in FIG. 6A, the unlocked portion 311E of the lock wedge necessarily also disengages from the sensor 311C.

In certain example embodiments, the lock wedge may be laterally moved into and out of the locking position by the motor. A solenoid or other electro-mechanical device may also be used to move the lock stopper or lock wedge.

As indicated above, the housing 102 includes PCB 306 that may include various modules, components, or the like. FIG. 8A shows a first side of an electronic circuit board (PCB 306) of the band of FIG. 1 and FIG. 8B shows a second opposite side of the electronic circuit board that is located in the housing of FIG. 1. In certain examples, the view shown in FIG. 8A is a "top" side of PCB 306 and the view shown in FIG. 8B is a "bottom" side of PCB 306. In other words, when a band 100 is placed about a wrist of a person, the top side of the PCB is oriented away from the wrist of the wearer—although it will be appreciated that how the PCB is arranged in the housing of the band may vary based on different manufacturing or design considerations.

PCB 306 includes a low frequency (LF) antenna 802 designed to transmit and/or receive radio frequency (RF) signals in a range between about 30 and 300 kHz. Signals that are transmitted and/or received via antenna 802 include transmissions to/from RFID components included with the band 100.

Button circuit 804 is a circuit coupled to button 108 (e.g., via the touch or pressure sensor described above) such that when button 108 is triggered the button circuit 804 is activated. Upon activation, the MCU 820 can cause a duress transmission to be sent from the RF components of the band.

The transmission may indicate that the wearer of the band (a patient) is in some kind of duress and requires assistance.

Ultra high frequency (UHF) antenna 806 is an antenna designed to transmit and/or receive RF signals between about 300 Mhz and 5 Ghz. This includes signals for public safety purposes, wireless networking signals (e.g., 802.11x standards, Bluetooth®, Wi-Fi direct, etc), pages, cellular wireless signals, and the like.

It will be appreciated that the signal range of the antennas in the housing 102 may be adjusted based on the particular needs of an application. In certain examples, only one type of antenna may be included.

Programmer connector 808 is provided to allow a technician to connect to the PCB and interact with the modules on the PCB. For example, a technician may connect with programmer connector 808 for the purpose of and uploading or installing new firmware to be used for controlling MCU 820 (described below). In certain examples, the programmer connector 808 is a physical interface that the technician may plug into. In certain example embodiments, the programmer connector may include wireless access that allows firmware (or other interactions with the modules of the PCB) to be performed from a remote location (which may be a couple feet or hundreds of miles away from the band 100).

Display connector 810 is a connector for a cable that is connected to drive display 106. In certain examples, the display is an electronic paper display and accordingly the display connector 810 may be an electronic paper display (EDP) connector. The display connector 810 is an interface that communicates a digital or analog video (or image) signals to the display 106.

Battery connection 812 is a connection interface that connects battery 312 to the PCB 306 to provide power for the modules of the PCB 306. The battery connection 812 may also include functionality to allow the charge level of the battery 312 to be measured. The measured charge level may then be displayed on the display of the band.

Switch 814 corresponds to the above-described tactile switches 311B and 311C. Providing the tactile switches directly on the PCB may allow for some manufacturing efficiencies as the PCB (and associated components) may be installed into the housing of the band without having to separately install the tactile switches (e.g., the PCB can be assembled separately).

LED 815 is a light emitting diode controlled using the MCU 820 and/or other components of the PCB and may indicate the mode of the band. The LED 815 can be visible from outside of the housing of the band and may blink and/or change color depending on the mode. The visual cues provided by the LED can provide information to patients, staff, and/or technicians. For example, the LED may indicate that RF activity is occurring, that the band is outside of a designated area, that the band is unlocked, that the band is low on battery, the band is locked, etc.

Turning to FIG. 8B, an acceleration sensor 816 is provided. The acceleration sensor may a one or multi-axis accelerometer (e.g., 1, 2, or 3 axes). In certain example embodiments, sensed differences in accelerations may be used to trigger additional functionality. For example, data from the acceleration sensor(s) may be used in a process to determine that a person has fallen out of a hospital bed. In certain examples, when this type of condition is detected an alarm or notification may be sent to other users. Other types of movement or directional sensors may also be included in the housing 102. For example, gyro sensor and/or a magnetometer may be included.

In certain example embodiments, when movement is determined (e.g., based on the received information from the sensors) to be less than a predetermined threshold the PCB (e.g., the MCU) may switch some or all of the components in the band (e.g., the MCU, transmitters, etc) into a power-saving state. In certain examples, a frequency of updates from the band to an external source may be reduced based on the movement information. For example, in normal operating conditions an update frequency may be 5 times per minute. In response to determining that the movement of the band is less than the threshold, the MCU adjusts the update frequency to 1 time per minute to preserve the battery in the band. In certain examples, active transmissions from the band may be stopped or suspended and the band may only become responsive to external receivers that have exciters for the passive RFID components of the band.

Low frequency (LF) transmitter 818 and ultra-high frequency (UHF) 822 transmitter can be used to transmit data from the band 100 (e.g., components in the band) to external receivers via RF signals. For example, RF receiver antennas may be placed throughout a hospital to receive and/or transmit RF signals to/from band 100. LF transmissions create electromagnetic fields that excite other LF receivers. In certain examples, the receivers can be placed on assets associated with a patient, such as, for example, a wheel chair or a life support medical device. Each asset in a hospital may have a receiver (e.g., an exciter) that is assigned an identifier (that may or may not be unique—e.g., the identifier may simply identify that the asset is a wheel chair as opposed to a particular wheelchair). In such instances, the receiver on the asset can send a transmission to another receiver to report that the patient is in proximity to the asset. Alternatively, or in addition, the band may communicate this information in response to have its passive RFID components activated. The transmissions may include an ID of the band that the patient is wearing and an ID of the asset (e.g., the receiver). A computing system may then determine (e.g., inferentially) that the patient is sitting in and/or using a particular asset (such as a wheelchair) or that the patient is not next to a particular asset.

A microcontroller unit (MCU) 820 is provided on the PCB and is programmed to control the various modules, sensors, and components of the band 100 connected thereto (e.g., via conductive paths on PCB 306). For example, the MCU 820 may be programmed to turn the motor 311A off in response to detecting either the lock portion or unlock portion of the lock wedge coming into contact with a respective tactile sensor. In certain examples, activation of the above mentioned pressure switch disposed on lock portion 311D may trigger a micro program in the MCU to send a transmission that indicates that help is needed by the patient wearing the wristband.

In certain example embodiments, a system on a chip (SoC) may be disposed on the PCB and connected with MCU 820 and within the housing. In other examples, an off the shelf (or customer) microprocessor may be used. It will be appreciated, however, that the power requirements for such a system may result in a decreased time before the battery runs out and needs to be replaced or recharged.

In certain example embodiments a memory device is also provided on the PCB. In certain examples, the memory device includes read-only memory, read-write memory, or a combination of the two. In certain example embodiments, flash memory is used. The memory may include volatile and non-volatile memory.

Figure 8C:
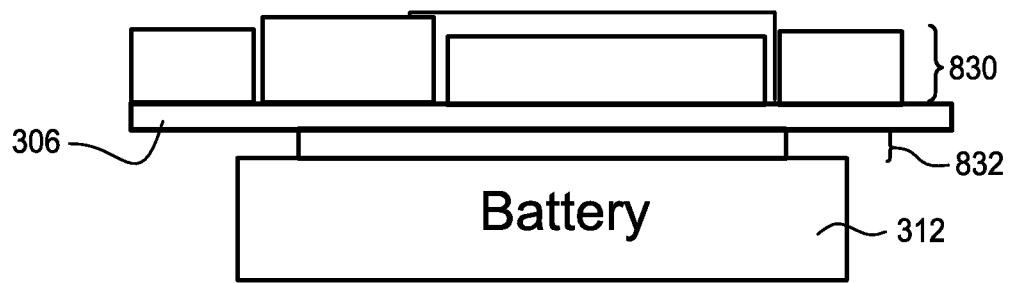
FIG. 8C is a cross-sectional view of the electronic circuit board and battery of the band in FIG. 1.

FIG. 8C is a cross-sectional view of the electronic circuit board and battery of the band in FIG. 1. Components 830 in the cross-section view may include those components shown in FIG. 8A—e.g., low frequency antenna, display connector, programmer connecter, battery connection, etc. Components 830 are disposed on a first side or top side of PCT 306 and components 832—e.g., those shown in FIG. 8B—are disposed on a second or bottom side of the PCB 306. The PCB and the components disposed thereon are suitably coupled to battery 312. The battery 312 may then be disposed on or secured to mid plate 314. For example, the battery may be secured to mid plate 314 by using one or more straps, one or more bolts or screws, adhesives, and the like. Alternatively, or in addition, the top portion 110 may be secured to the mid plate 314 in a manner that wedges or restricts the movement of the PCB and associated components within the enclosure created by the combination of the mid plate 314 and upper portion 110.

Figure 9:
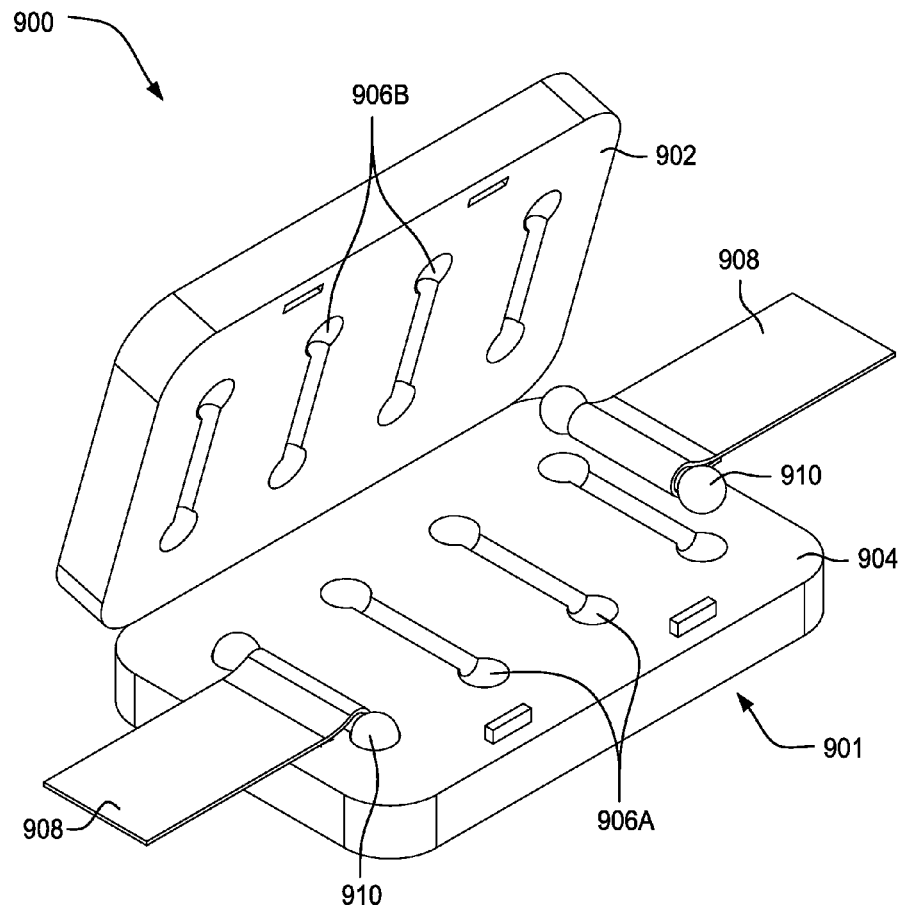
FIG. 9 is a perspective view of a housing of a band according to certain example embodiments.

FIG. 9 is a perspective view of a housing of a band according to certain example embodiments. Band 900 includes housing 901 with an upper housing 902 rotatably coupled to a lower housing 904. The upper and lower housings can move between an open position of the housing 901 (shown in FIG. 9) and a closed position of the housing 901 when the upper and lower housings are placed flush against each other.

The upper housing 902 includes four recessed groves 906B that correspond to four recessed groves 906A in the lower housing 904. When the housing 901 is placed in a closed position, the respective matching grooves of the upper and lower housing create an enclosure that is designed to accept end elements 910 of strap 908. In other words, the enclosures created by the grooves 906A and 906B when the housing 901 is placed into a closed position are molded to accept strap end element 910. Strap 908 may be constructed out of any suitably strong and flexible material (e.g., as described in relation to strap 104).

In certain example embodiments, one of the ends 910 may be more permanently attached to housing 901 (e.g., as explained above in connection with FIG. 1). The band 900 that is thus created by the combination of the strap 908 and housing 901 may be adjusted in size to some degree by moving the end element of one end of the strap to different ones of the paired grooves 906A and 906B. Thus, one end of the strap 908 may be "fixed" to the housing 901 and one end of the strap 908 may be an adjustable end that can be moved between one of the plural possible groves in the housing 901.

In certain example embodiments, the end element 910 along with strap 908 includes conductive elements so that a circuit is created when both end elements are placed into the housing. For example, end element 910 may be formed, at least partly, out of conductively loaded rubber and/or a suitably conductive metal. In certain examples, the strap 908 includes a conductive element that runs lengthwise along the strap to connect one end 910 to the other end 910.

In certain example embodiments, the grooves 906A in the lower housing 904 are made out of a non-conductive material. In contrast, grooves 906B of the upper housing 902 include conductive elements such that ends 910 may be conductively coupled to PCB circuits through a conductive link included in the housing. Further, each of the grooves 906B may be conductively linked to each other so that when end elements 910 come into contact with grooves 906B a conductive link is formed between strap 908, end elements 910, and housing 901 (e.g., grooves 906B)—no matter which ones of the grooves are selected for use. In certain examples, conductive elements are placed in both grooves 906B and 906A or placed in 906A and not 906B.

The placement of conductive elements in the upper housing 902 but not the lower housing 904 may allow the formation of a circuit only when the housing is moved into a closed position and the grooves 906B come into contact with end elements 910. Accordingly, simply placing both ends into respective grooves 906A of the lower housing 904 will not create the desired circuit. Thus, the circuit can be activated (and associated functionality of the band initiated) when the housing is closed, but remain dormant when the housing is open.

Figure 10:
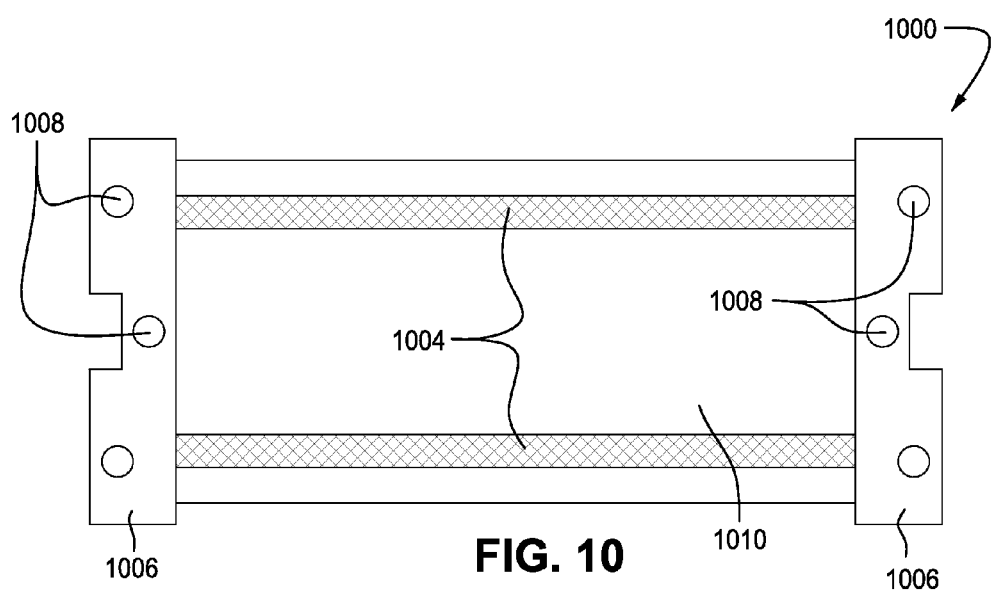
FIG. 10 is a top view of a strap of a band according to certain example embodiments.

FIG. 10 is a top view of an example non-limiting strap that is configured to interface with a band according to certain example embodiments. Strap 1000 includes a flexible main body 1010 that may be formed of, for example, a flexible polymer (e.g., PVC—polyvinylchloride) or other suitable material ordinarily used in constructing a flexible strap of a band that is to be placed around a patient.

The strap includes a stainless steel wire mesh 1004 (between about 0.5 mm and 2 mm in diameter) that is embedded length wise along each side of flexible main body 1010 of the strap 1000. In certain examples, only one mesh may extend along the length of the strap (e.g., as opposed to the pair shown in FIG. 10). The wires within mesh 1004 may be circular in cross section—e.g., to deter cutting with scissors or the like.

The meshes 1004 connect to, at each end of the band 1000, metal alloy terminations 1006. In certain examples, the ends of the mesh 1004 are securely cast into the metal alloy terminations 1006. In certain examples, the terminations are casted around the mesh 1004 when it is placed into a mold. The metal alloy terminations 1006 also include contact points 1008 cast into the respective terminations 1006. The contact points 1008 are designed to mate with protrusions of a housing (e.g., the clam shell housing for FIG. 2 or another housing) in which the strap 1000 may be placed. In certain example embodiments, the strap includes protrusions and the housing includes cavity contact areas. In certain example embodiments, a housing includes one or more (e.g., plural) spaced-apart sets of receiving contact cavities (or protrusions) so as to provide further possible adjustments of the overall circumference of the band when it is worn by a user. For example, the housing may include 1 cm spacing between four differently situated contact areas. Such an arrangement may correspondingly allow a fixed length strap to be adjusted by up to 4 cm in 1 cm increments.

In certain example embodiments, terminations on the ends of the strap may be constructed out of non-conductive material with contact points that include conductive elements conductively coupled to the meshes within the strap.

When the contact points 1008 come into contact with a housing (or protrusions of a housing), an electrical circuit is formed that includes the housing (e.g., the circuits in the housing), the strap (e.g., the meshe(s) in the strap), and the contact points on the terminations of the strap. In certain examples, the strap may be locked into the housing (e.g., as described herein) thus allowing the band to be secured about the wrist, ankle, etc of a person.

Figure 11A:
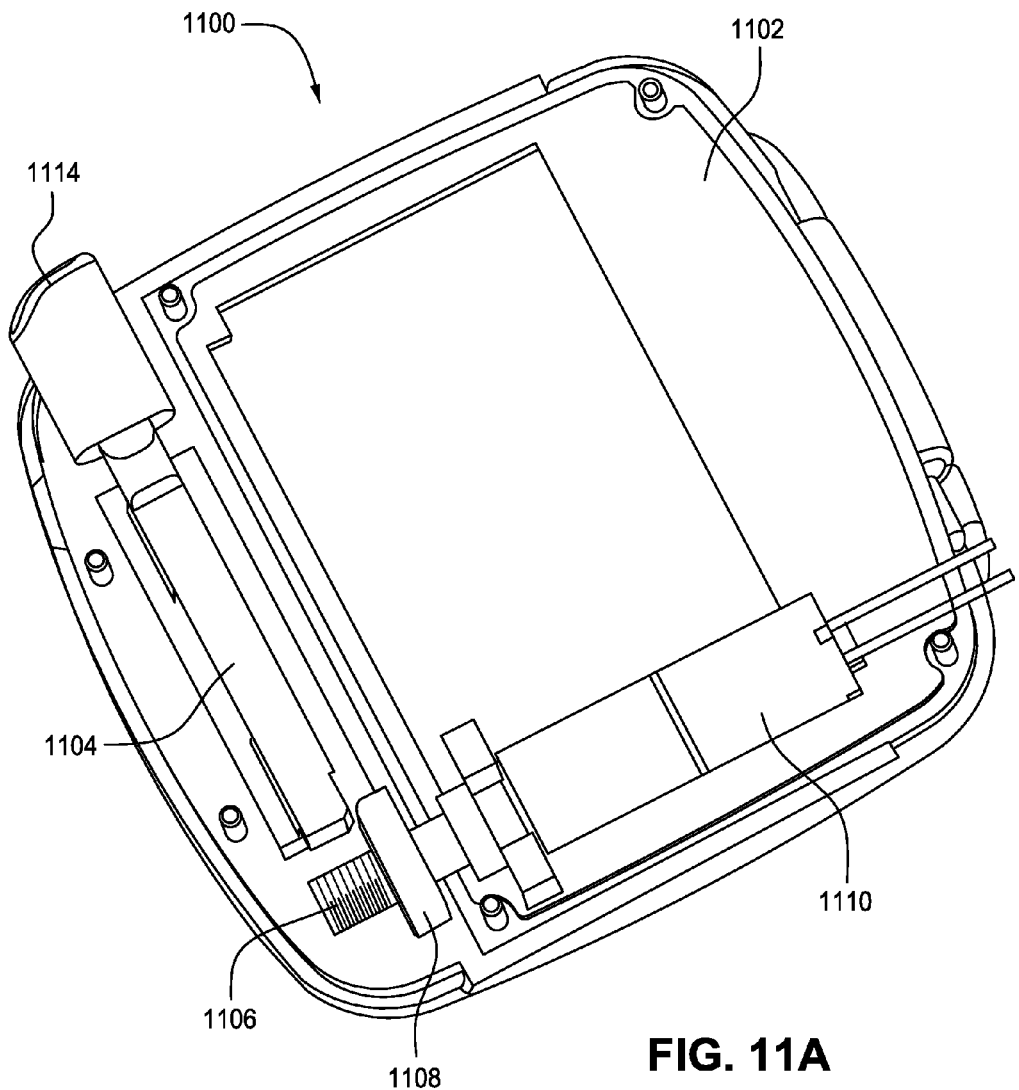
FIG. 11A is a perspective view of a housing used in a band according to certain example embodiments.
Figure 11B:
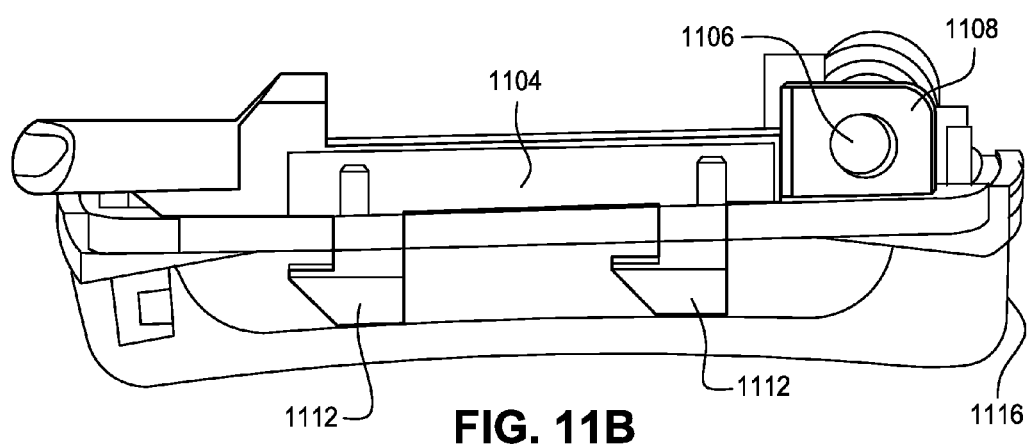
FIG. 11B is a side view of the housing of FIG. 11A.

FIG. 11A is a perspective view inside a housing of a band according to certain example embodiments and FIG. 11B is a side view of the view of FIG. 11A.

Housing 1100 may be a clam shell like housing that is designed to accept a strap according to certain example embodiments. The clam shell of the housing is formed when the housing is in the open position and the base plate 1102 is pivoted away from the lower portion 1116 of the housing 1100. The housing 1100 may then be closed and mechanically secured (e.g., securing the base plate 1102 to the lower portion 1116) by a strong spring loaded latch 1104 that has two spaced hooks 1112 with ramps acting against a spring loaded bias force to snap into a secure engagement upon closing the housing. In certain examples, the mechanical movement (e.g., longitudinally) permitted by the spring loaded mechanism may be on the order of 5 mm. The latch 1104 is coupled to an externally accessible trigger 1114 (e.g., a protruding knob or button, an easily accessible recessed push-piece, etc) such that when the trigger 1114 is activated and the housing is closed, the latch 1104 moves longitudinally allowing hooks 1112 to pass through latching apertures in the lower portion 1116 of the housing. The disengagement of the latch 1104 from the lower portion 1116 allows the housing 1100 to swing into an open position to permit removal (or installation) of a strap.

In certain examples, the latch 1104 is spring biased against the lower portion 1116 such that releasing the hooks 1112 from contact with the lower portion 1116 will pop the hooks 1112 through apertures of the lower portion 1116 of the housing 1100. In certain example embodiments, a spring bias force acts in a direction towards the trigger 1114.

When the latch 1104 is secured (as shown in FIG. 11B) it may also be locked into the secured position by activating motor 1110 to move stopper 1108 into a position that prevents movement of the latch 1104 away from the secured position (and into the unsecured position). More specifically, motor 1110 can be used to rotate a threaded lead-screw shaft 1106 to move (e.g., linearly) an engaged lead-screw nut 1108 into/out of a position which blocks longitudinal movement of latch 1104. If the lead-screw does not block movement of the latch 1104, it can be moved to unsecure the clam shell (e.g., to permit removal of the band from a patient's wrist, to replace a battery, to adjust the length of an attached strap, etc). In certain examples, the lead-screw nut is made of nylon material so as to be non-compressible, strong, low friction, etc.

In certain examples, a PCB and components thereon is provided within housing 1100 to control motor 1110 and the positioning of nut 1108. Accordingly, the lead-screw nut can be moved into and out of position based on control from a microprocessor (via the motor) or the like located on the PCB.

In certain example embodiments, a band includes an active or passive RFID tag that may be used to facilitate control of the motor and the locking functionality provided with a mechanical stopper (e.g., the lead-screw nut in FIG. 11A). In other words, the locking functionality within the band (e.g., that locks a latch into a secured position) may be remotely controlled using the RFID tag. The tag can use various wireless communication options via local UHF, GSM, GPRS, BT, and the like.

As the locking functionality can be remotely controlled (e.g., from a central computer system, or a mobile device used by a staff member) the need for a physical key (e.g., a physical tool) to lock and unlock wristbands (e.g., for a healthcare facility) can be removed.

The locking functionality shown herein also provides mechanical strength by moving a physical stopper to lock a release mechanism (e.g., a latch) that is being used in the housing. In certain example embodiments, the amount of energy that is used to put the lock stopper (e.g., the nut) into place can be relatively low because no energy is required to "hold" the lock in place once it has been positioned to a desired state. In other words, while energy (e.g., to operate the motor) may be needed to move the lock stopper, little or no energy may be needed to hold the lock stopper in place.

Certain example embodiments may include alternative, or additional, functionality. For example, the PCB in the housing may include software combined with hardware, and/or hardware (firmware, PGA's, ASICs, etc) to monitor the state of an internally provided battery. When the battery reaches a certain level of charge, an alert or message may be sent outwardly using wireless communication (e.g., via an active RFID chip provided on the PCB)

In certain examples, if the battery level reaches a sufficiently low level a stopper that locks the latch into place may be automatically moved to an unlocked position—e.g., before the battery becomes so low that it may no longer be capable of powering a motor (or similar electro-mechanical device) to move the stopper. For example, if the battery level reaches under 10% of capacity, the PCB may automatically instruct the motor to activate and move the stopper to an unlock permitted position. In certain examples, a further message may be sent that notifies a central computing system of the unlocking of the stopper.

In certain examples, an external power connection is provided in an external portion of a housing to allow the internal battery to be recharged. In certain examples, the battery and/or other devices in the housing may allow the battery to be inductively charged (e.g., wireless charging).

In certain examples, locking functionality is disabled (e.g., the motor will not activate) while the housing is still open and may only be engaged when a top portion of the housing is closed with the bottom portion and the latch placed into its secured state position. In certain examples, a test may be initiated to determine if both ends of a strap have been engaged with the housing. In other words, the locking functionality provided by the motor may only be engaged when the clam shell housing is closed and both sides of a strap are placed in appropriate receiving locations of the housing. In certain examples, the placement of the straps and closed nature of the housing may be determined by the PCB (e.g., a processor thereon) monitoring a created circuit as described herein.

Resistance Adjustment

As discussed herein, when the housing of a band is closed, a circuit may be formed between the housing circuitry, contact points, strap, and/or other elements of the band. Resistance of this circuit, for example, may be between about 500 and 1500 ohms, or perhaps about 600 ohms on average. Furthermore, if resistance of the circuit is detected to be in excess of some upper limit (e.g., 2,000 ohms), this may be taken to indicate that the band has been opened and, unless previously authorized, may set off a suitable alarm. On the other hand, if an excessively low resistance is detected (e.g., less than 50 ohms), it may indicate that a bypass circuit has been placed across the band in an attempt at unauthorized opening/removal of the band. In either case, if the band determines the resistance is "outside" of some pre-determined bounds then an alert may be triggered (e.g., a wireless message is sent to a remote computing device)

There are expected variations in the initial nominal band resistance (e.g., due to different band lengths, different manufacturers, different manufacturing batches, changes in material properties with age, etc). Thus, to accommodate such things while still maintaining an effective alarming feature (e.g., because false alarms can be detrimental to overall system effectiveness), software (or firmware, ASICs, etc) can be incorporated into an example band (e.g., in the housing of the band, which may include a microprocessor, program memory, display, RF transceiver, etc) to measure the initial resistance of the band at the time of its most recent closure. Thereafter, an alarm limit (e.g., an upper limit) is set as a function of this initial upon-closing resistance measurement. Alternatively, or in addition, the alarm limits may be set to be a predetermined percentage (e.g., +/−20%) of such (e.g., initially) a measured resistance.

In certain examples, if an existing upper limit is exceeded upon an initial closing event, then the band (the housing, strap, etc) may be indicated (to remote computer system or locally—e.g., a display on the band) as "No Good" and discarded. The band may include a predetermined "threshold" that is hardwired (or similarly set) into the band. This range(s) is not typically adjustable, but would rather be put in place to ensure the band is within some expected operational parameters before being put into use. Thus, a predetermined range may be 200 to 2000 ohms. If an initial measured resistance (e.g., a measurement taking upon an initial closing) is outside this range, the housing may not latch (or the lock may not engage) or some other indication may be provided that the band is "faulty" or defective and is not to be used. Specifically, if the resistance measurement range is outside of the preset tolerance range it may indicate that the band may not operate as expected (e.g., do to increased resistance or relatively little resistance). In such situations, it may be more difficult to detect when a band is being tampered with.

Figure 12:
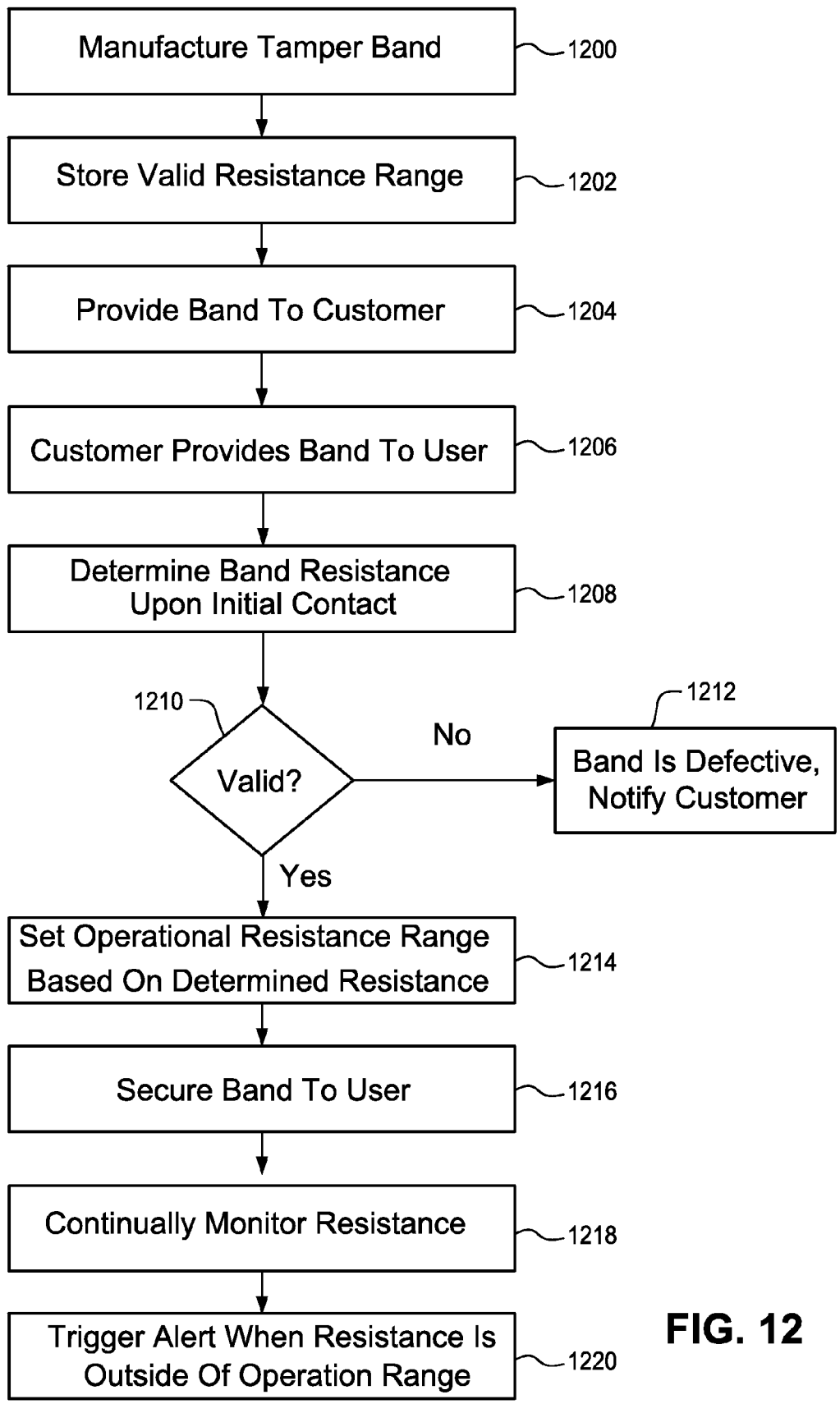
FIG. 12 shows a flow chart for determining a resistance setting of a band according to certain example embodiments.

FIG. 12 shows a flow chart for determining and using a resistance setting of a band according to certain example embodiments. Some or all of the elements in the flow chart of FIG. 12 depict executable computer program code structure (e.g., instructions that configure a microprocessor in a certain way).

In step 1200 a tamper band is created (e.g., including the strap and housing of the band). As part of the manufacturing process of the band (or at a later date—e.g., at a customer site), a valid resistance range (e.g., a maximum range of valid resistances that may be accepted upon initial closing of the band) is stored with the in step 1202. In certain examples, the valid resistance range is stored in long term non-volatile memory (e.g., in firmware, in read-only memory, etc) of the band and cannot be easily modified. This resistance range is used to set the minimum and maximum resistances of the band such that if the resistance from a circuit is outside of this range the band is defective or no longer good. The reasons for the measured resistance being out of bounds may include faulty circuitry in the housing (e.g., the conductive circuitry within the housing is faulty), the strap is faulty (the conductive meshes of the strap have been cut or have worn down over time), the connection between the housing and strap is faulty (e.g., dirt is covering the conductive contact points), etc In certain examples, only one value is stored. For example, the value may be a maximum value, a minimum value, or value with a corresponding range (e.g., +/−20%). In certain examples, the band only checks to see if the measured resistance is above (or alternatively, below) the stored value. In other words, the band may only check if the resistance is above a given value, but not check if the resistance is below another value.

In step 1204, a manufactured band is provided to the customer. The band includes the housing and a strap. As explained above, differently sized straps may be provided to the customer. The differently sized straps may correspondingly have different "expected" resistances (while all housings, or the circuits within the housings, may expect to be within some more narrow expected resistance range). The customer then provides the band (a housing and appropriately selected strap) to a patient at step 1206. When the band is locked into place with a patient, the resistance of the band may be determined. For example, the resistance of the circuit formed by a strap, terminations, and housing (e.g., the circuits therein) may be measured at about 700 ohms.

In step 1210 the band determines if the measured resistance is a valid resistance value. Specifically, the band may determine the measured resistance value to be outside of the stored manufacturing resistance range (e.g., the maximum range). In certain examples, this test may be performed remotely on an external device that is (e.g., wirelessly) communicating with band.

In step 1212, if the measured resistance value is outside of the manufacturing resistance range, then the band (or some part thereof) may be defective. When this occurs a message that the band is defective may be sent to a remote computing system (e.g., a central computing service, a handheld device, etc) or may output to a local display of the band. As discussed above, the band may also prevent the housing from locking and/or securing with the strap.

In step 1214, if the band (or the circuit formed by components of the band) is inside the manufacturing resistance range, then an operational resistance range is set based on the determined resistance from step 1208. For example, an operational resistance range may be +/−20% of the initially measured resistance. In certain examples, the operational resistance range may be +/−200 ohms from the measured resistance. Accordingly, the operational resistance range may vary (but may still be within the manufacturing range) over the life of the band (and its associated components) and may be adjusted depending on the type of strap that is to be coupled to the housing of the band.

In certain example embodiments, the measured resistance and/or a range based on the measured resistance is stored in read-write memory of the band. In other words, each time the band is placed around a person, the resistance of the band when it is closed is measured and stored. In certain example embodiments, the measured resistance value and the predetermined resistance values (e.g., stored in the band during the manufacturing process) are stored on an external computing node. In this situation, comparisons between resistance measurements and/or stored resistance values (e.g., to determine if the band is still good, if the band has been cut, etc) may be performed on the remote computing node. In other words, the band may provide information on the state of the band and the remote computing node (e.g., a server) may provide the processing logic that determines what actions to take based on that information. Other processes that are described herein may also be carried out by processing resources on the band, on a remote computing node, or a combination thereof.

In any event, after the operational resistance range is set for the band, the band may be secured to the user in step 1216 (e.g., by securing the housing to the strap, and engaging a lock within the housing). After securing the band, the resistance of the circuit is continually monitored in step 1218. Thereafter, in step 1220, if the measured resistance is determined to be outside of the operational resistance (e.g., set in 1208), an alert or message may be sent to a staff member or the like.

Accordingly, certain example bands may use dynamic resistance ranges that may vary based on the particular physical properties of each band (e.g., housing, strap, etc). The bands may also include a manufacturing range that is used to indicate when the band goes "bad."

Figure 13:
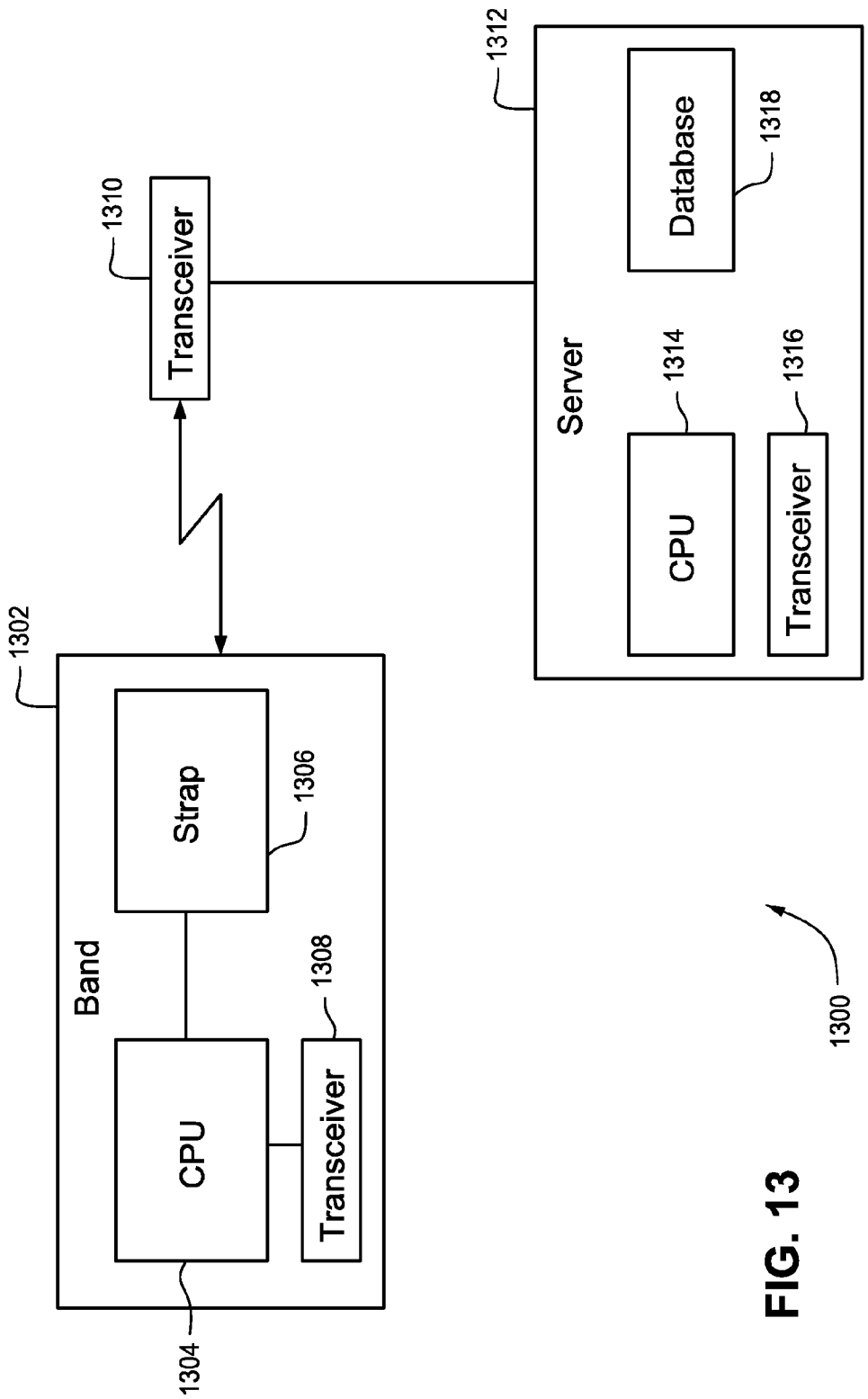
FIG. 13 is a block diagram illustrating an example system for controlling functionality of a band from a remote computing device.

As discussed above, certain example bands may include RFID and/or other wireless communication functionality. FIG. 13 is a block diagram illustrating an example system 1300 for controlling functionality of a band from a remote computing device. Band 1302 includes a central processing unit 1304, strap 1306, and a transceiver 1308. The transceiver 1308 may include an RFID tag like and/or more complex wireless functionality (e.g., 802.11x wireless functionality, cellular, etc). The band 1302 is in wireless communication with a transceiver 1310. Transceiver 1310 may be a base station, a passive or active RFID receiver, a wireless access point, etc.

The transceiver 1310 is coupled to a computer system (server 1312) that is used to provide commands and monitor functionality of the band. The transceiver 1310 may wirelessly communicate with the server 1312 or may communicate via a wired connection.

Server 1312 includes a central processing unit (CPU) 1314, a database 1318, and a transceiver 1316 that is used to communicate with at least the transceiver 1310. The database is stored in a memory (e.g., volatile storage or non-volatile storage) of the server 1312 and accessible by the CPU 1314. The database includes information on the band 1302. This information includes patient information, information that associates a given band (e.g., a serial number) with a given patient (e.g., a lookup table within the database). The database may also store certain event information, such as, for example, movement information (e.g., based on GPS and/or which receiver the band is communicating with), battery information (e.g., that the battery is at a low level an needs to be charged), medical related event information (e.g., blood pressure, glucose levels, and the like that have been detected from other sensors also included with a band).

In certain example embodiments, a message may be triggered by the user depressing a button that is provided on the band. In response to determining or detecting that a button has been pressed (e.g., with the pressure sensor noted above in connection with button 108), a processor may instruct the transceiver to send a message that the user has pressed the button. This message is relayed to the server from one or more intermediary transceivers and the server can then take further action based on the received message. In certain examples, the further action includes sending a notification (e.g., an automated telephone call, a page, an e-mail, an SMS message, etc) to one or more staff members. The message may include information about the user of the band (e.g., the location, patient information, etc).

In certain examples, the band simply sends a message to the server that the button on the band has been activated. In certain examples, information on the activation of the band is accompanied by other information (e.g., a serial number of the band, the state of the locking mechanism—locked or unlocked, etc).

In certain example embodiments, the band sends a message based on particular conditions of the band. For example, the processor on the band may perform some initial processing before determining what to include in the content of the message that is to be sent. For example, if the band is locked and its button is pushed, then an alarm message may be sent (e.g., that the user needs assistance). If the band is not yet locked (or just locked), the message may be a notification to the central server that the band is now locked (or will be locked). In certain examples, the notification based on depressing the button may be a request to lock the band. In other words, the engagement of the locking mechanism of a band may be controlled from the server where the server issues commands to the band instructing it to lock.

Mobile Extender

In certain example embodiments, the transceiver that is included in a band may have a relatively short transmission range (e.g., no more than 10s of meters). While the range associated with this type of transceiver may not be an issue in a controlled facility (e.g., a hospital) where corresponding receivers may be placed throughout the facility, removing the band from the facility may place the band out of reach of centralized control. In other words, the coverage offered by the receivers in a facility allow the band to remain in contact with a central system for the majority (or all) of the time. This allows the locked and unlocked state of the band to be controlled from a central system. However, if the band is taken outside the coverage range of the receivers within the facility then the overall functionality provided by the band (e.g., based on commands issued from the central system) may be decreased.

Consider the following example: a person is delivering documents or a prototype to an overseas location in a briefcase and the briefcase is constructed so that part of the strap of the band is coupled to the briefcase such that the brief case cannot be removed while the band is secured to the person. Upon leaving a departure area, the band is secured to the person and a lock command is sent from the central computing system to lock the secured band to the person. At this point, the brief case (and the band) are locked to the person and there is no feasible way that the band can be removed (and the briefcase separated from the person) without having a corresponding unlock command sent from the central system.

When the person arrives at the destination to deliver the briefcase there may be no receivers nearby to interact with the band and thus authorize the opening of the band.

Figure 14:
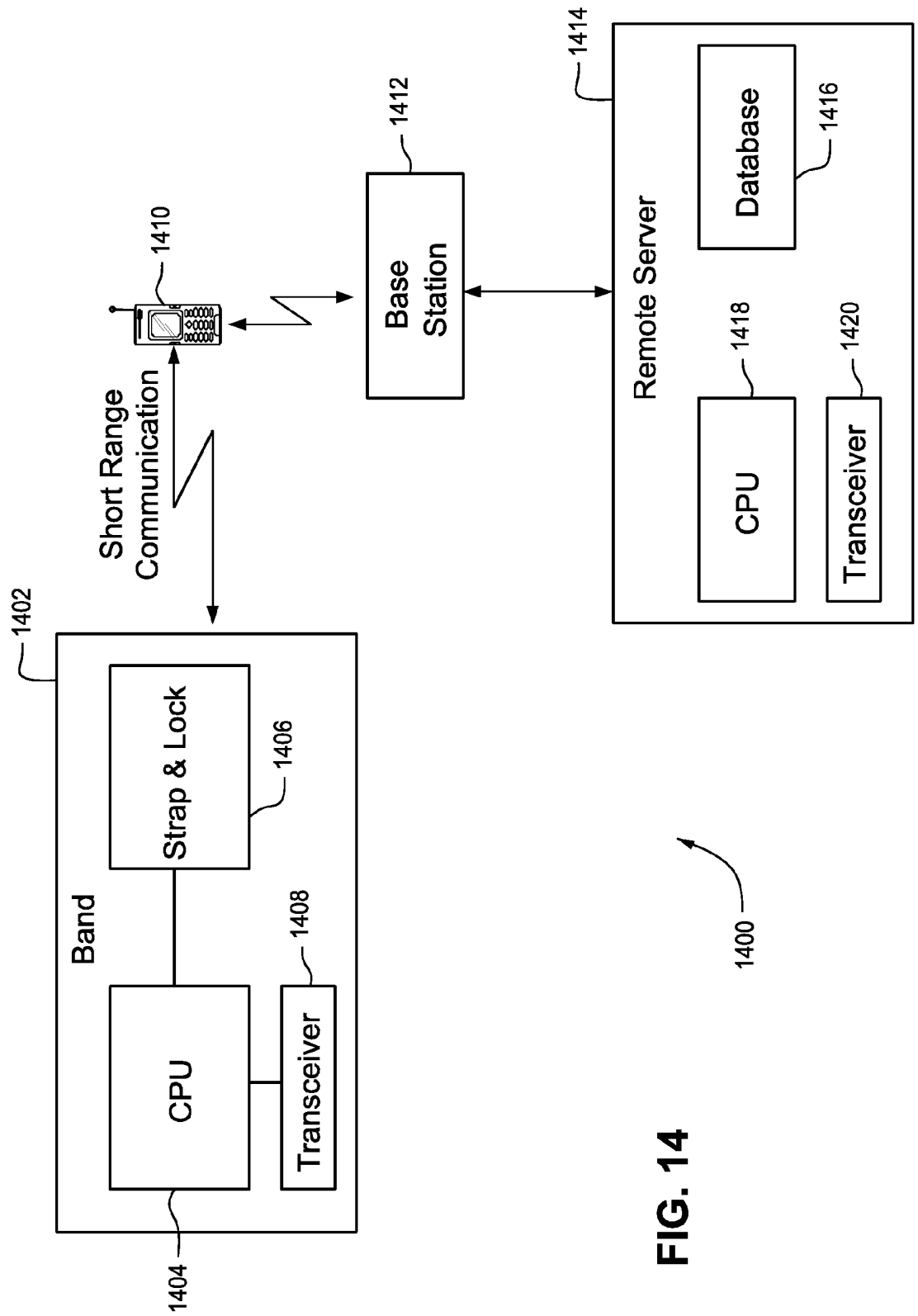
FIG. 14 is a block diagram illustrating an example system for communicating and controlling functionality of a band from a remote computing device though a mobile computing device.

FIG. 14 is a block diagram illustrating an example system 1400 for communicating and controlling functionality of a band from a remote computing device though a mobile computing device. A band 1402 includes a central processing unit 1404, a transceiver 1408, and a strap 1406 that is locked in place to the band. Transceiver 1408 is a short-range transceiver that can operate with relatively low power—e.g., a passive or active RFID tag, a transceiver that implements Bluetooth, Wi-Fi direct, or the like.

The band 1402 communicates, using the transceiver 1408 and via a short range communication technique, an electronic data message to the mobile device 1410. The mobile device can be a tablet, smart phone, or the like that includes electronic processing capability (e.g., a central processing unit, memory, etc) and is being carried by the wearer of the band. After receiving the electronic data message the mobile device can then translate or route the electronic data message contained in the short range communication to remote server 1414 via base station 1412 and/or via the internet and an internet service provider. The base station may be a base station used in cellular communication (e.g., GSM, 3G, 4G, etc) or may be a wireless access point (e.g., 802.11x). For example, the mobile device 1410 may include software that is programmed to control the mobile device to communicate with the band and then establish a connection with remote server 1414. Preferably the communication range of a transceiver in the mobile device is longer than the communication range of the transceiver in the band.

The remote server 1414 includes a central processing unit 1418, a transceiver 1420, and a database 1416 (e.g., that is stored in volatile or non-volatile memory). Accordingly, even if the band is outside of the communication range of a typical transceiver (e.g., as descried in FIG. 13) used for communicating with the band, it may still use an intermediary device (a mobile device) to establish a communication link with a remote server (e.g., a central processing system that controls the locking functionality on the band).

Figure 15:
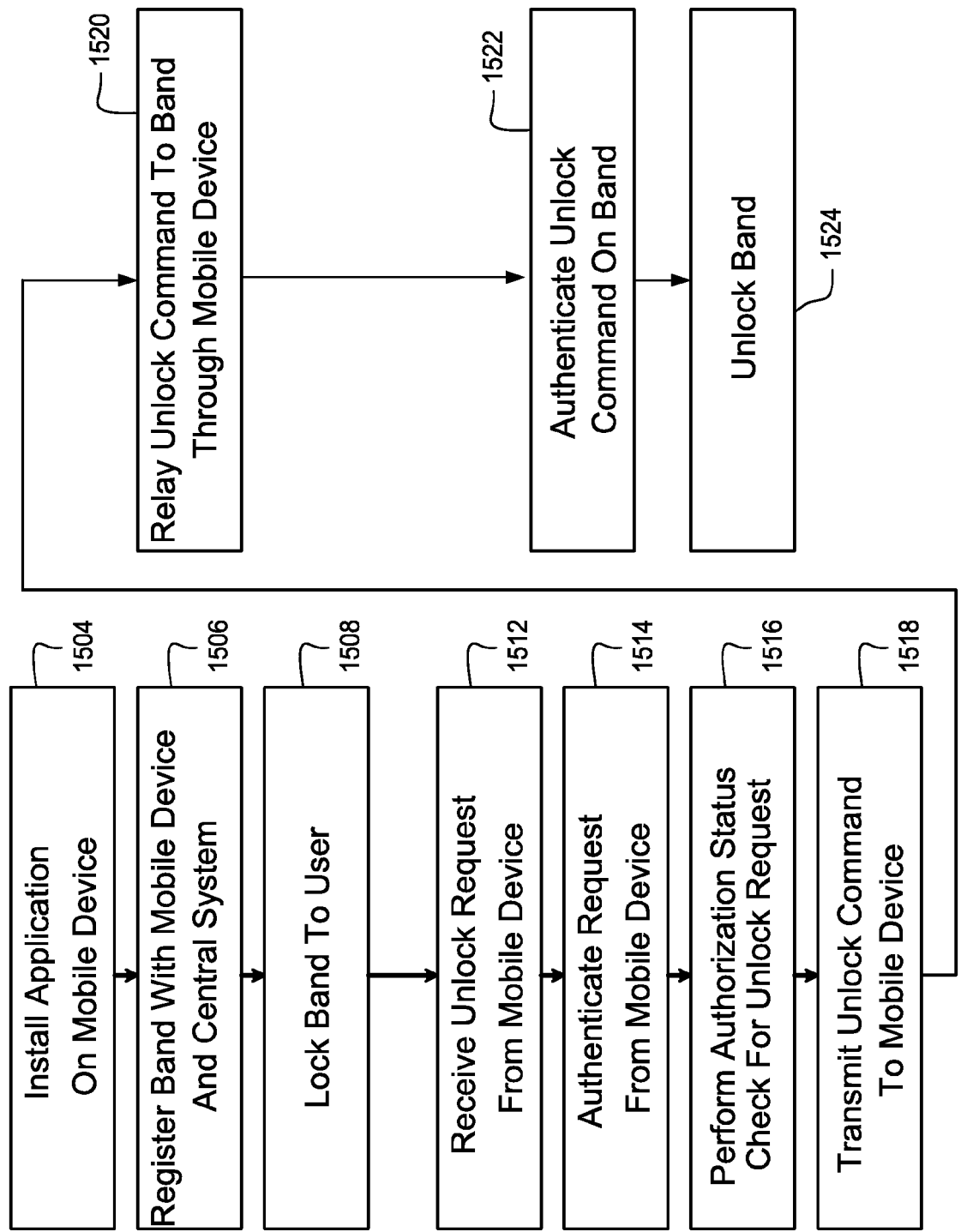
FIG. 15 is a flow chart that illustrates a process for remotely unlocking a band by using a mobile device.

FIG. 15 is a flow chart that illustrates a process for remotely unlocking a band by using a mobile device. In certain example embodiments, the process in FIG. 15 may be implemented with the devices shown in FIG. 13 or 14 (in addition to the bands described herein). Some or all of the elements of this process may be implemented as computer program code that configure (program) a processor(s) in a band, a mobile device, and/or a server or central computing system to carry out the described functionality.

In step 1504, a mobile device that is to be used as a communication extender has its functionality updated with software. For example, the software may program the mobile device to accept certain types of short-range communications that are to be communicated from the band.

In step 1506, the particular band that is associated with a particular person (or a particular mobile device) is registered with a central system and the mobile device. For example, a unique identifier for the band and/or the mobile device may be stored in the database of the centralized system. In certain examples, authentication information for the band is stored on the mobile device and authentication information for the band and the mobile device is stored in the central system. In certain examples, the band is registered with the mobile device as defined in the Bluetooth specification (or other wireless communication protocol). This registration process may pre-authenticate the band with the mobile device and/or the central server—e.g., by exchanging encryption keys or the like.

In step 1508 the band (e.g., the housing and/or strap) is locked to the user. As described above, the central system may issue a command that locks the band in place. In other examples, the band may be locked by pressing a button on the band. This process then engages the locking system of the band and the band may then report, either directly or indirectly (e.g., through the mobile device), that the band is in a locked state to the central system (which may then store the state information of the band). In certain instances, communication with the band is performed with regular transceivers of a facility (e.g., as shown in FIG. 13).

After locking the band, a user may then travel to a remote location in which communication with the central system is provided through the mobile device that the user is also carrying. At an appropriate time (either at the user's request or some other triggered event), the central system receives an unlock request from the mobile device at step 1512. This request may include identifying information about the band that is to unlocked, positional information (e.g., GPS coordinates of the device), and the like.

In certain examples, the mobile device includes software that allows the person wearing the band to initiate the unlock request from the mobile device. In other examples, the unlock request is initially triggered from the band (e.g., by the associated person triggering a button). In certain example embodiments, a request that is initiated from the mobile device may first notify the band that the unlock request is going to be sent. This may include having the band perform encryption on the request that is then passed back to the mobile device that then transmits the request to the central system. In such a system, only the band may know the encryption keys to use in the encryption (or signature) of the request. In other words, the mobile device may not be able to completely independently issue a successful request because it does not know how to frame the request (e.g., use the correct encryption).

In any event, in response to receiving the request, the central computing system authenticates the identity of the mobile device, band, and/or other user specific information in step 1514. This authentication process may include verifying a username/password combination, verifying a digital signature from the mobile device (or band), or other technique used to authenticate the identity of a requesting device, band, and/or user of the device.

After authentication, the system then determines if the unlock request is an authorized request (e.g., granted or denied) in step 1516. For example, the central system may determine that the band, mobile device, and/or person using the band has not yet reached a designated location (or is in an incorrect location). In such a situation, the system may deny the request to unlock the band (e.g., issue a responsive electronic data message informing the mobile device and/or the band that the unlock request has been denied). Alternatively, if the system determines the unlock request is authorized, then an unlock command is transmitted back to the mobile device in step 1518.

In step 1520, the unlock command (or notification that the unlock request has been denied) is relayed through the mobile device back to the band. Specifically, the mobile device receives a transmission from the central computing system and then translates that communication (or the information contained in that communication) into a message that is sent to the band using the short range wireless communication technique.

In step 1522, the band receives the unlock request and determines if the unlock request is a valid unlock request. Specifically, the band determines that the unlock request is a valid request issued by the central processing system and not a forged request sent directly from the mobile device (or some other device). This authentication may be performed using public or private key cryptography or other techniques for verifying the authenticity of a received data message (e.g., that it was issued from the central computing system).

In step 1524, if the band determines that the unlock command is valid, the CPU of the band instructs a motor or other device in the band to unlock the band to thereby allow the band to be removed from the person.

While the above example is described with reference to a band, it may also be applied to lock that is contained within a briefcase. In other words, a brief case (or a lock attached to a brief case) may communicate with the mobile device.

In certain example embodiments, conductive teeth may be integrated into upper and/or lower housings of the band such that a conductive bridge may be formed via snap-forced prongs engaged with a conductive strap conductive teeth extrusions in either the upper or lower housings.

In certain example embodiments, the information may be displayed on a display device of the wristband itself or may be wirelessly transmitted back to a requesting device or central system. Such wireless communication may be carried out via Bluetooth®, Wi-Fi, cellular, near field communication (NFC), and/or the like.

In certain example embodiments, the current battery charge status may be displayed and presented to the wearer of the wristband (or other persons). For example, if the battery power level falls below 20%, the RFID on the band may transmit a maintenance notification to a server (e.g., that this particular battery needs to recharged or replaced) while also locally displaying a low battery alarm.

In certain example embodiments, LED lights and/or an LCD screen can be programmed to behave in accordance with information stored in an RFID chip. For example, one or more LEDs can be activated to emit different colors to provide a clear indication for the staff that a patient is diabetic or to indicate specific types of allergies that require staff attention (e.g., yellow for a diabetic or red for allergy information). Such visual indicators can provide care takers with a way to quickly assess what actions may or may not need to be taken for a given patient.

In certain example embodiments a switch button (or multiple buttons) may be included on the wristband to allow a patient or other persons (e.g., children) to trigger a request (e.g., an urgent request) for assistance. After activating the button, the RFID on the wristband may wirelessly send an alert to a central server (e.g., via a RFID receiver). The central system may then submit an alert for staff or other persons to take action. The alert may include the name of the patient or other person and/or their location. Other information, such as, for example, currently known medical conditions or the like may also be included.

An example band may be associated with a real-time location system (RTLS) or tracking system. For example, rooms within a structure or building may be equipped with infrared (IR), radio, or the like signaling units. Each unit may be associated with a unique ID that can be used to identify its place or location (e.g., floor 4, hallway B). When user worn bands pass within a coverage area (e.g., within a 15-by-15-room that includes a signaling unit) the location of the band (or the location of the signaling unit) may be reported to a server for tracking.

In certain example embodiments, a wristband may wirelessly communicate with a personal computing system as opposed to, or in conjunction with, a centralized server. For example, a wrist band may communicate with a smart phone, tablet computer, personal computer (e.g., laptop or desktop), beeper, or the like. In certain example embodiments, wireless communication may be carried out via Bluetooth®, Wi-Fi, cellular (e.g., GSM), near field communication (NFC), and/or the like. In certain examples, multiple wireless communication techniques may be used to facilitate the transfer of data between the wristband and another device—e.g., NFC may be used to bootstrap a Bluetooth connection.

It will be appreciated that while the term "wristband" may be used in connection with certain example embodiments, that those embodiments may be adapted for use for any extremity of a person. For example, a wristband may be adapted to be worn around the ankle of a person.

While the invention has been described in connection with what is presently considered to be the preferred embodiment(s), it is to be understood that the invention is not to be limited to the disclosed embodiment(s), but on the contrary, is intended to cover various modifications and equivalent arrangements as now will be apparent to those skilled in the art and included within the spirit and scope of the claims.

What is claimed is:

1. A band adapted for affixation around a human extremity, said band comprising:
   a housing that includes a first housing element and a second housing element;
   a wireless transceiver disposed in the housing and configured to wirelessly communicate with at least one remote computing node;
   a latch disposed in the housing and configured to move between at least an unsecured position and a secured position, in the unsecured position the first and second housing elements being movable with respect to each other, in the secured position the first and second housing elements being restrained from movement with respect to each other;
   a blocking member disposed in the housing and controllably moveable between at least a first position and a second position, the blocking member being moveable to the first position when the latch is in the secured position to obstruct movement of the latch to the unsecured position;
   an electric motor disposed in the housing and configured to move the blocking member from the first position to the second position and from the second position to the first position, electric motor is configured to rotate the blocking member from the first position to the second position and from the second position to the first position; and
   data processing circuitry coupled to the wireless transceiver and to the electronic motor, the data processing circuitry being configured:
      to determine that the blocking member is in at least one of the first and second positions;
      to cause the electric motor to controllably move the blocking member from the first position to the second position based on determining that the blocking member is in the first position; and
      to cause the electric motor to controllably move the blocking member from the second position to the first position based on determining that the blocking member is in the first position.

2. The band of claim 1, wherein the housing includes at least one housing contact element configured to electrically interface with a corresponding at least one strap contact element of a strap when the first and second housing elements are secured to one another.

3. The band of claim 2, further comprising:
   the strap, which includes at least one electrically conductive element that extends along a major length of the strap to electrically couple a first strap contact element of a first end of the strap to a second strap contact element of a second end of the strap, the at least one strap contact element including the first strap contact element and the second strap contact element,
   wherein, when the first and second housing elements are secured to one another and the strap ends are installed within the housing, the strap, via the at least one conductive element, forms a conductive circuit with electrical circuits within the housing.

4. The band of claim 3, wherein:
   the first end of the strap is fixedly attached to the housing with at least one bolt or screw, and
   the second end of the strap is secured to the housing by mating the at least one housing contact element with the second strap contact element and securing the first and second housing elements are secured to one another.

5. The band of claim 1, wherein the transceiver is configured to receive a lock or unlock communication from the at least one remote computing node, and the processing circuitry is configured to cause the electric motor to move between the first and second position based on the lock or unlock communication.

6. The band of claim 1, further comprising at least one sensor configured to detect that the blocking member is currently disposed in at least one of the first and second positions.

7. The band of claim 6, wherein:
the at least one sensor comprises a first pressure sensor and a second pressure sensor,
the blocking member includes a locking portion and an unlocking portion,
in the first position of the blocking member, the locking portion obstructs the latch and the unlocking portion is in contact with the second pressure sensor to indicate that the blocking member is in a position that locks the latch in the secured position,
in the second position of the blocking member, the locking portion is in contact with the first pressure sensor to indicate that latch is unlocked and moveable between from the secured to the unsecured position.

8. The band of claim 1, further comprising a hinge that rotatably couples the first housing element to the second housing element.

9. A band adapted for affixation around a human extremity, said band comprising:
a housing that includes a first housing element and a second housing element;
a wireless transceiver disposed in the housing and configured to wirelessly communicate with at least one remote computing node;
a latch disposed in the housing and configured to move between at least an unsecured position and a secured position, in the unsecured position the first and second housing elements being movable with respect to each other, in the secured position the first and second housing elements being restrained from movement with respect to each other;
a blocking member disposed in the housing and controllably moveable between at least a first position and a second position, the blocking member being moveable to the first position when the latch is in the secured position to obstruct movement of the latch to the unsecured position;
a trigger member coupled to the latch and disposed to be accessible at an external surface of the housing, the trigger member being configured to cause the latch to move between the secured and unsecured position when the blocking member is in the second position thereby allowing the first housing element to be unsecured from the second housing element; and
at least one movement sensor disposed within the housing and configured to detect permitted limited movement of the latch even when the blocking member is in the first position,
wherein the wireless transceiver is configured to, responsive to the at least one movement sensor detecting the permitted limited movement of the latch even when the blocking member is in the first position, communicate with the at least one computing node a message indicating that the latch has been moved when the blocking member is in the first position.

10. A band adapted for affixation around a human extremity, said band comprising:
a housing that includes a first housing element and a second housing element;
a wireless transceiver disposed in the housing and configured to wirelessly communicate with at least one remote computing node;
a latch disposed in the housing and configured to move between at least an unsecured position and a secured position, in the unsecured position the first and second housing elements being movable with respect to each other, in the secured position the first and second housing elements being restrained from movement with respect to each other, wherein when the band is affixed around the human extremity and the first housing and second housing are secured by the latch, at least a portion of the band forms a conductive circuit around the human extremity;
a blocking member disposed in the housing and controllably moveable between at least a first position and a second position, the blocking member being moveable to the first position when the latch is in the secured position to obstruct movement of the latch to the unsecured position;
a memory device; and
at least one processing circuit coupled to the wireless transceiver and to the memory device, the at least one processing circuit being configured to:
determine that the first housing is secured with the second housing to form the conductive circuit;
determine an initial resistance value of the conductive circuit; and
store a data value to the memory device based on the determined initial resistance of the conductive circuit.

11. The band of claim 10, wherein the memory device includes a read-only memory that stores at least one predetermined expected manufacturing resistance value and the at least processing circuit is configured to:
determine that the initial resistance value is outside of a valid resistance range based on the at least one stored predetermined expected manufacturing resistance value;
send a message, via the transceiver, to the at least one computing node that indicates that at least a component in the band is faulty based on the determined first resistance value being outside the valid resistance range; and
prevent the blocking member from moving to the first position based on the determined initial resistance value being outside the valid resistance range.

12. The band of claim 10, wherein the at least one processing circuit is configured to:
continue to monitor resistance of the conductive circuit;
determine if the monitored resistance of the conductive circuit is outside a resistance range based on the stored initial resistance-related value; and
send a message, via the transceiver, to the at least one remote computing node based on a determination that the monitored resistance of the conductive circuit is outside the resistance range based on the stored initial resistance-related value.

13. A machine implemented process for dynamically setting an electrical resistance value for a band that is for affixation around a human extremity, the band including a housing and a strap, the housing including a memory device, at least one processor device, a transceiver that is configured to communicate with a remote computing device, a latch that, in a secured configuration, secures the housing to the strap, and a lock that is configured to mechanically lock the latch in the secured configuration, the machine implemented process comprising:
responsive to initially securing the band by securing the housing to the strap, determining an initial resistance value of an electrical circuit formed by the strap and circuitry within the housing;

storing, in the memory device, at least one operational resistance value based on the determined initial resistance value;

machine-locking the latch in the secured configuration based on the determined resistance value;

thereafter machine-monitoring resistance of the circuit;

machine-determining if the monitored resistance is outside of a resistance range that is based on the at least one operational resistance value; and machine-transmitting a message via the transceiver to the remote computing device if the monitored resistance is determined to be outside of the resistance range.

14. The method of claim 13, further comprising:

loading, from the memory device and into the processing circuit, a previously stored acceptable resistance value; and performing, by the processing circuit, a comparison based on the previously stored acceptable resistance value and the initial resistance value to determine whether resistance of the circuit indicates a component of the circuit to be defective, wherein the latch is only locked in the secured configuration when the circuit is determined to have a resistance that indicates that the circuit is not defective.

15. A band control system comprising:

a band including:
  a band transceiver configured to communicate with a mobile device, using short range radio transmissions, a remote unlock request; and
  an electronic lock system that, responsive to receipt of a granted unlock request electronic data message, unlocks the band;

the mobile device including:
  a short range communication transceiver configured to communicate with the band transceiver and receive the remote unlock request from the band;
  a wireless transceiver, which has a longer range than that of the band transceiver, configured to relay the remote unlock request to a remote computing node; and the remote computing node including at least one processor circuit configured to:
  receive the remote unlock request from the mobile device;
  attempt to authenticate the remote unlock request;
  based on the authentication, transmit, via a transceiver of the remote computing node, a granted unlock request message to the mobile device, wherein the mobile device is configured to relay, via the short range communication transceiver, the granted unlock request message to the band.

* * * * *